United States Patent
Kernert et al.

(10) Patent No.: US 10,067,909 B2
(45) Date of Patent: Sep. 4, 2018

(54) SPARSE LINEAR ALGEBRA IN COLUMN-ORIENTED IN-MEMORY DATABASE

(71) Applicants: David Kernert, Heidelberg (DE); Frank Koehler, Heidelberg (DE); Wolfgang Lehner, Dresden (DE)

(72) Inventors: David Kernert, Heidelberg (DE); Frank Koehler, Heidelberg (DE); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 14/314,750

(22) Filed: Jun. 25, 2014

(65) Prior Publication Data

US 2015/0379054 A1    Dec. 31, 2015

(51) Int. Cl.
*G06F 17/16*       (2006.01)
*G06F 17/30*       (2006.01)

(52) U.S. Cl.
CPC ........ *G06F 17/16* (2013.01); *G06F 17/30153* (2013.01)

(58) Field of Classification Search
None
See application file for complete search history.

(56) References Cited

U.S. PATENT DOCUMENTS 8,631,031 B1 * 1/2014 Kepner ............ G06F 17/30587
                                                707/769

2009/0282207 A1 * 11/2009 Burkart ............... G06F 12/0207
                                                711/170
2013/0159248 A1    6/2013 Mueller
(Continued)

OTHER PUBLICATIONS

Krueger, Jens et al., "A Case for Inverted Indices in In-Memory Databases", 2012, IARIA, The Fourth International Conference on Advances in Databases, Knowledge, and Data Applications, pp. 15-24.*

(Continued)

*Primary Examiner* — Pierre Vital
*Assistant Examiner* — Alicia Antoine
(74) *Attorney, Agent, or Firm* — Fountainhead Law Group P.C.

(57) ABSTRACT

Embodiments relate to storing sparse matrices in an in-memory column-oriented database system. Specifically, recent hardware shifts of primary storage from disc into memory, allow execution of linear algebra queries directly in the database engine. Dynamic matrix manipulation operations (like online insertion or deletion of elements) are not covered by most linear algebra frameworks. Therefore a hybrid architecture comprises a read-optimized main structure, and a write-optimized delta structure. The resulting system layout derived from the Compressed Sparse Row (CSR) representation, integrates well with a columnar database design. Moreover, the resulting architecture is amenable to a wide range of non-numerical use cases when dictionary encoding is used. Performance in specific examples is evaluated for dynamic sparse matrix workloads, by applying work flows of nuclear science and network graphs. Embodiments allow performing linear algebra operations on large, sparse matrices commonly associated with scientific computations and analytical business applications.

18 Claims, 19 Drawing Sheets

(56) References Cited

U.S. PATENT DOCUMENTS

| | | | | |
|---|---|---|---|---|
| 2014/0324821 A1* | 10/2014 | Meiyyappan | ..... | G06F 17/30492 707/715 |
| 2015/0106382 A1* | 4/2015 | Liu | ................... | G06F 17/30315 707/744 |
| 2015/0113031 A1* | 4/2015 | Reinwald | ................ | G06F 17/16 708/520 |
| 2015/0149441 A1* | 5/2015 | Nica | ................. | G06F 17/30463 707/719 |

OTHER PUBLICATIONS

White, James et al., "On Improving the Performance of Sparse Matrix-Vector Multiplication", 1997, IEEE, pp. 66-72.*
Delaney, Kalen, Bob Beauchemin, Conor Cunningham, Jonathan Kehayias, Benjamin Nevarez, Paul S. Randal, "Microsoft SQL Server 2012 Internals", 2013, Microsoft Press, pp. 1-189.*
Abadi, Daniel, Peter Boncz, Stavros Harizopoulos, Stratos Idreos, Samuel Madden, "The Design and Implementation of Modern Column-Oriented Database Systems", 2012, Foundations and Trends in Databases, vol. 5, No. 3, pp. 197-280.*
Walters, Robert E., Michael Coles, Robert Rae, Fabio Ferracchiati, Donald Farmer, "Accelerated SQL Server 2008", 2008, Apress, pp. 1-799.*
Plattner, Hasso. "A common database approach for OLTP and OLAP using an in-memory column database." In Proceedings of the 2009 ACM SIGMOD International Conference on Management of data, pp. 1-2. ACM, 2009.*
Kourtis, Kornilios, Georgios Goumas, and Nectarios Koziris. "Optimizing sparse matrix-vector multiplication using index and value compression." In Proceedings of the 5th conference on Computing frontiers, pp. 87-96. ACM, 2008.*
Basic Linear Algebra Subprograms, retrieved and printed on Apr. 28, 2014. http://www.netlib.org/blas/.
Array Query Language, http://www.xldb.org/arrayql/. Retrieved and printed on Apr. 28, 2014.
IBM Netezza Data Warehouse Appliances, retrieved and printed on Apr. 28, 2014. http://www.ibm.com/software/data/netezza/.
Oracle R Enterprise, http://www.oracle.com/. Retrieved and printed on Apr. 28, 2014.
Automatically Tuned Linear Algebra Software ATLAS, retrieved and printed on Apr. 28, 2014. http://math-atlas.sourceforge.net/.
Intel (R) Math Kernel Library, retrieved and printed on Apr. 28, 2014. http://software.intel.com/en-us/intel-mkl.
Compressed Sparse Row Graph (CSR Graph), The Boost C++ Libraries, retrieved and printed on Apr. 28, 2014. http://www.boost.org.
D. J. Abadi, M. Stonebraker, E. Lau, A. Lin, and et al. "C-Store: A Column-Oriented DBMS". Proceedings of the 31st VLDB Conference, pp. 553-564, 1995.
R. R. Amossen and R. Pagh. "Faster Join-Projects and Sparse Matrix Multiplications". In ICDT, pp. 121-126. ACM, 2009.
E. Anderson, Z. Bai, C. Bischof, S. Blackford, and et al., LAPACK Users' Guide. SIAM, third edition, 1999.
R. Barrett, M. Berry, T. F. Chan, J. Demmel, , and et. al. "Templates for the Solution of Linear Systems: Building Blocks for Iterative Methods", 2nd Edition. SIAM, 1994.
L. S. Blackford et al. "ScaLAPACK Users' Guide". SIAM, 1997.
P. G. Brown. "Overview of SciDB: Large Scale Array Storage, Processing and Analysis". In SIGMOD, pp. 963-968. ACM, SIGMOD' 1O, Jun. 2010.
J. Cohen, B. Dolan, M. Dunlap, J. M. Hellerstein, and et al. "MAD Skills: New Analysis Practices for Big Data". VLDB, 2(2):1481-1492, Aug. 2009.
F. Faerber, N. N May, W. Lehner, P. Grosse, I. Mueller, H. Rauhe, and J. Dees. "The SAP HANA Database—An Architecture Overview". IEEE Data Eng. Bull., 35(1):28{33, 2012.
H. Garcia-Molina and K. Salem. "Main Memory Database Systems: An Overview". IEEE Trans. Knowl. Data Eng., 4(6):509-516, Dec. 1992.
A. Ghoting, R. Krishnamurthy, E. Pednault, B. Reinwald, and et al. "SystemML: Declarative Machine Learning on MapReduce". In ICDE, pp. 231-242. IEEE, 2011.
J. R. Gilbert, C. Moler, and R. Schreiber. "Sparse Matrices in Matlab: Design and Implementation". SIAM J. Matrix Anal. Appl., 13(1):333-356, Jan. 1992.
J. M. Hellerstein, C. Re, F. Schoppmann, D. Z. Wang, and et al. "The MADlib Analytics Library: or MAD Skills, the SQL". VLDB, 5(12):1700-1711, Aug. 2012.
J. Kepner and J. Gilbert. "Graph Algorithms in the Language of Linear Algebra". Software, Environments, Tools. SIAM, 2011.
D. Kernert, F. Koehler, and W. Lehner, "Bringing Linear Algebra Objects to Life in a Column-Oriented In-Memory Database". In IMDM, 2013.
M. Kersten, Y. Zhang, M. Ivanova, and N. Nes. "SciQL, a Query Language for Science Applications". In EDBT/ICDT Workshop on Array Databases, pp. 1-12. ACM, 2011.
M. Li, J. H. Badger, X. Chen, and et al. An Information-Based Sequence Distance and its Application to Whole Mitochondrial Genome Phylogeny. Bioinformatics, 17(2):149-154, 2001.
R. Mittal and A. Al-Kurdi. "LU-Decomposition and Numerical Structure for Solving Large Sparse Nonsymmetric Linear Systems". J. Comput. Appl. Math., 43(1-2):131-155, 2002.
V. Valsalam and A. Skjellum. "A framework for High-Performance Matrix Multiplication based on Hierarchical Abstractions, Algorithms and Optimized Low-Level Kernels". CCPE, 14(10):805-839, 2002.
L. Page, S. Brin, R. Motwani, and T. Winograd. "The PageRank Citation Ranking: Bringing Order to the Web". Technical report, Stanford University, 1998.
R. Roth. "Importance Truncation for Large-Scale Conguration Interaction Approaches". Phys.Rev., C79:064324, 2009.
Y. Saad. SPARSKIT: A Basic Tool Kit for Sparse Matrix Computationsz, Version 2, 1994.
G. Stewart and USAF Office of Scientic Research. "Lanczos and Linear Systems". Comp. Sc. Tech. Rep. Series. University of Maryland, 1991.
M. Stonebraker, S. Madden, and P. Dubey. "Intel "Big Data" Science and Technology Center Vision and Execution Plan". SIGMOD Rec., 42(1):44-49, May 2013.
R. Yuster and U. Zwick. "Fast Sparse Matrix Multiplication". ACM Trans. Algorithms, 1(1):2-13, Jul. 2005.
Vishal Sikka et al., "Efficient Transaction Processing in SAP HANA Database," Proceedings of the 2012 Int'l Conf. on Management of Data, Sigmod '12. May 20, 2012, pp. 731-742.
David Kernert et al., "SLACID—Sparse Linear Algebra in a Column-oriented In-memory Database System," Scientific and Statistical Database Management, ACM, Jun. 30, 2014, pp. 1-12.
Open Source Alglib: "Sparce Matries," ALGLIB User Guide,, Feb. 27, 2013, pp. 1-3.
Extended European Search Report (from a related foreign application), Appln No. 15001835.6, dated Oct. 20, 2015.

* cited by examiner

FIG. 5

1: procedure SPGEMV(MatrixName, $x$) ▷ $x$: Vector
2:     $y \leftarrow 0$ ▷ $y$: Target Vector
3:     Main, Delta $\leftarrow$ GETIMPL(MatrixName)
   ▷ Main part ①
4:     for $x_i \neq 0 \in x$ do
5:        start $\leftarrow$ Main.CSRIndex[$i$]
6:        stop $\leftarrow$ Main.CSRIndex[$i+1$]$-1$
7:        switch Main.iivc[$i$] do
8:           case 0 continue
9:           case 1
10:             for start $\leq k <$ stop do
11:                if Main.ivvc[$i$] $= 0$ then continue
12:                col $\leftarrow$ Main.Col[$k$]
13:                $y[\text{col}] \leftarrow y[\text{col}] + x_i \times$ Main.Val[$k$]
   ▷ Delta part ②
14:     for $0 \leq i <$ Delta.Size do
15:        if Delta.vc[$i$] $= 0$ then continue
16:        col $\leftarrow$ Delta.Col[$i$]
17:        $y[\text{col}] \leftarrow y[\text{col}] + x[\text{Delta.Row}[i]] \times$ Delta.Val[$i$]
18:     return $y$

FIG. 10

1: procedure LANCZOS(MatrixName)
2:     $T, v_k, v_{k-1} \leftarrow$ INITIALIZE($T, v_k, v_{k-1}$)     ▷ $v$ vector
3:     for $1 \leq i < m$ do
4:         $w \leftarrow$ SPGEMV(MatrixName, $v_k$)
5:         UPDATE($T, v_k, v_{k-1}, w$)
6:     $\lambda \leftarrow$ DIAGONALIZE($T, v_k, v_{k-1}$)     ▷ $T$: tridiagonal matrix
7:     return $\lambda$ 8: procedure GETENERGYSTATES(HamiltonianMatrix)
9:     ...
10:     while not ISCONVERGED($\lambda_k$) do
11:         $r1, r2, c1, c2 \leftarrow$ SELECTDEL(HamiltonianMatrix)
12:         DELETE(MatrixName, $r1, r2, c1, c2$)
13:         $\lambda_k \leftarrow$ LANCZOS(HamiltonianMatrix)
14:     ...

1: procedure BFSEARCH(GraphName, first, depth)
2:     $P \leftarrow 0$     ▷ $P$: result set
3:     $Q \leftarrow$ first     ▷ $Q$: set of vertices to visit
4:     $x \leftarrow$ CONVERT($Q$)
5:     while depth>0 do
6:         $y \leftarrow$ SPGEMV(GraphName,x)
7:         $x \leftarrow y$
8:         depth $\leftarrow$ depth $- 1$
9:     $P \leftarrow$ CONVERT ($y$)
10:     return P

SPARSE LINEAR ALGEBRA IN COLUMN-ORIENTED IN-MEMORY DATABASE

BACKGROUND

Embodiments relate to databases, and in particular, to methods and systems performing sparse linear algebra in a column-oriented in-memory database.

Unless otherwise indicated herein, the approaches described in this section are not prior art to the claims in this application and are not admitted to be prior art by inclusion in this section.

Linear algebra in the context of database systems is a subject of research, as it is a fundamental pillar of analytical algorithms. Matrices and matrix operations are used in a variety of use cases in the science and business world. Among these application fields are: nuclear physics, genome analysis, electrical, mechanical and chemical engineering, economical correlation analysis, machine learning and text mining, and graph algorithms, to mention only a few.

In the era of big data and the data deluge in business and science environments, data replication from database management systems (DBMS) into external linear algebra systems (for instance MATLAB or R), consumes increasing amounts of time and memory. As a consequence, data should only reside in a single system, which for business environments usually is a relational DBMS. However, disk-based DBMS's may exhibit poor performance of random access patterns on large data sets, such as linear algebra operations on very large matrices.

The decrease in Random Access Memory (RAM) prices in recent years has laid the foundation for the shift of the database storage from hard disc into main memory. This trend toward such "in-memory database" technology has resulted in considerable performance gains for analytical queries on large data sets. With the data residing in RAM, it has become worthwhile to investigate how structures and algorithms of numerical libraries can be integrated into the database engine.

Besides the change in database system design due to the emerging hardware trends, the introduction of a column-oriented database design has shown performance advantages on analytical workloads. Such performance stands in contrast to conventional row-oriented approaches.

Accordingly, there is a need for apparatuses and methods for performing sparse linear algebra in column-oriented in-memory database systems.

SUMMARY

Embodiments relate to storing sparse matrices in an in-memory column-oriented database system. Specifically, recent hardware shifts of primary storage from disc into memory, allow execution of linear algebra queries directly in the database engine. Dynamic matrix manipulation operations (like online insertion or deletion of elements) are not covered by most linear algebra frameworks. Therefore a hybrid architecture comprises a read-optimized main structure, and a write-optimized delta structure. The resulting system layout derived from the Compressed Sparse Row (CSR) representation, integrates well with a columnar database design. Moreover, the resulting architecture is amenable to a wide range of non-numerical use cases when dictionary encoding is used. Performance in specific examples is evaluated for dynamic sparse matrix workloads, by applying work flows of nuclear science and network graphs. Embodiments allow performing linear algebra operations on large, sparse matrices commonly associated with scientific computations and analytical business applications.

An embodiment of a computer-implemented method comprises causing an engine to store an updatable column representation of data including a row column in a main structure and in a delta structure of an in-memory database, and causing the engine to merge the delta structure into the main structure when a delta exceeds a threshold. The engine is caused to sort columns of the updatable column representation according to values of the row column. The engine is caused to derive an index according to the sorted columns. The engine is caused to reference the index to perform an algebraic operation, and to store a result of the algebraic operation.

A non-transitory computer readable storage medium embodies a computer program for performing a method comprising causing an engine to store an updatable column representation of data including a row column in a main structure and in a delta structure of an in-memory database, and causing the engine to merge the delta structure into the main structure when a delta exceeds a threshold. The engine is caused to sort columns of the updatable column representation according to values of the row column. The engine is caused to derive an index according to the sorted columns. The engine is caused to reference the index to perform an algebraic operation, and to cause the engine to store a result of the algebraic operation.

An embodiment of a computer system comprises one or more processors and a software program executable on said computer system. The software program is configured to cause an engine to store an updatable column representation of data including a row column in a main structure and in a delta structure of an in-memory database, and to cause the engine to merge the delta structure into the main structure when a delta exceeds a threshold. The engine is caused to sort columns of the updatable column representation according to values of the row column. The engine is caused to derive an index according to the sorted columns. The engine is caused to reference the index to perform an algebraic operation, and to cause the engine to store a result of the algebraic operation.

In certain embodiments the column representation comprises a Compressed Sparse Row (CSR) representation and a value comprises a row pointer.

According to some embodiments the data comprises a matrix.

In particular embodiments the column representation utilizes dictionary encoding.

Various embodiments may further comprise updating the delta structure utilizing a validity control vector.

According to some embodiments the algebraic operation comprises matrix-vector multiplication.

Particular embodiments may further comprise updating the delta structure by appending a triple.

The following detailed description and accompanying drawings provide a better understanding of the nature and advantages of embodiments.

BRIEF DESCRIPTION OF THE DRAWINGS

FIG. 5 shows matrix subarray access patterns.

FIG. 10 shows steps of a process for performing sparse matrix-vector multiplication according to an embodiment.

FIG. 11 shows steps of a process for eigenvalue calculation according to an embodiment.

FIG. 12 shows steps of a process for performing breadth-first searching according to an embodiment.

DETAILED DESCRIPTION

Figure 1:
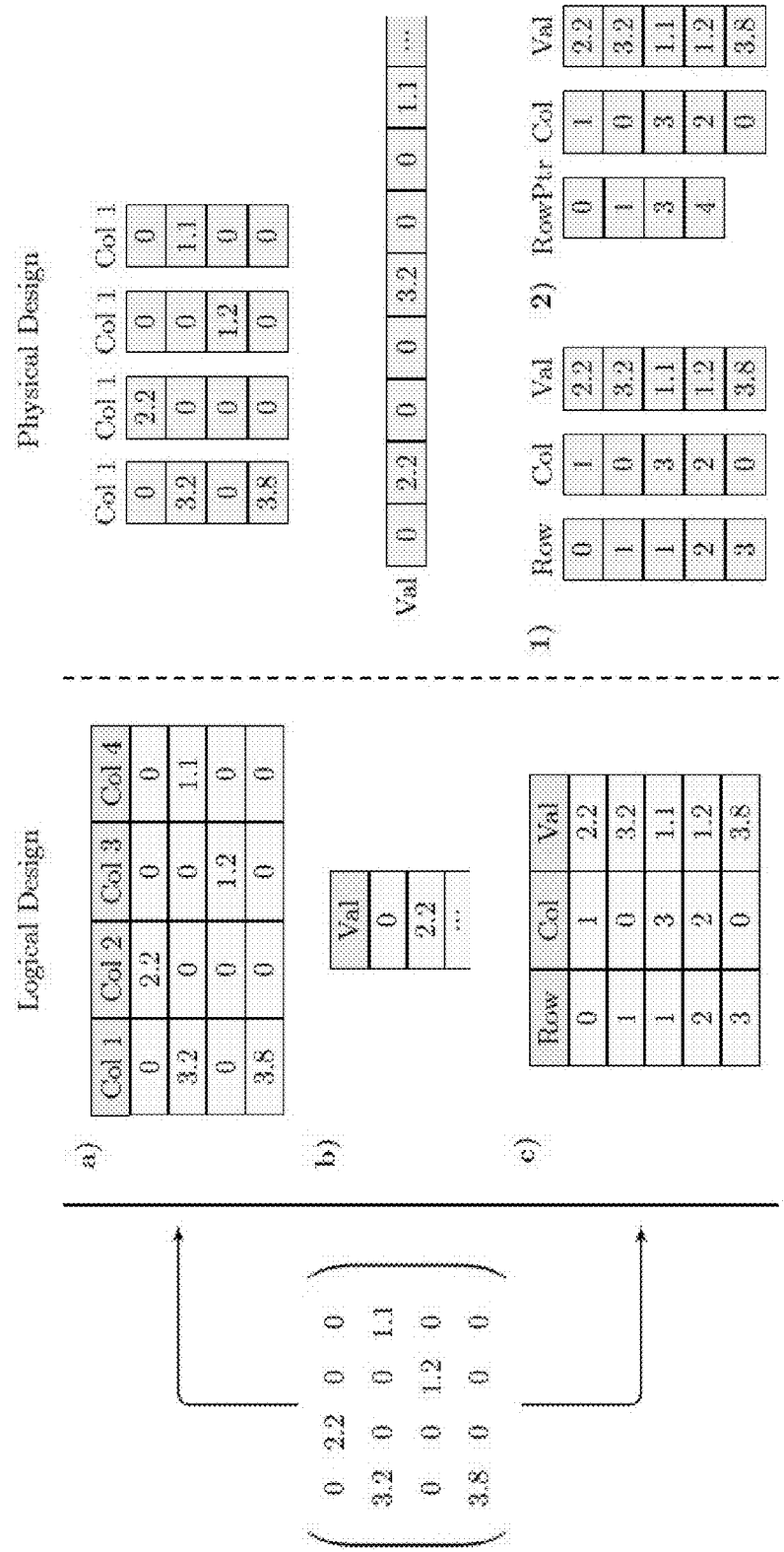
FIG. 1 shows an overview of different approaches to represent a matrix logically in a DBMS, and corresponding internal representations in a columnar storage.

Described herein are techniques for performing linear algebra in a column-oriented in-memory database system according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to storing sparse matrices in an in-memory column-oriented database system. Specifically, recent hardware shifts of primary storage from disc into memory, allow execution of linear algebra queries directly in the database engine. Dynamic matrix manipulation operations (like online insertion or deletion of elements) are not covered by most linear algebra frameworks. Therefore a hybrid architecture comprises a read-optimized main structure, and a write-optimized delta structure. The resulting system layout derived from the Compressed Sparse Row (CSR) representation, integrates well with a columnar database design. Moreover, the resulting architecture is amenable to a wide range of non-numerical use cases when dictionary encoding is used. Performance in specific examples is evaluated for dynamic sparse matrix workloads, by applying work flows of nuclear science and network graphs. Embodiments allow performing linear algebra operations on large, sparse matrices commonly associated with scientific computations and analytical business applications.

There are at least two major limitations of using of a conventional DBMS for linear algebra applications. First, random access on hard disc and unsuitable data structures and operators can result in poor performance.

A second restriction is usability. Since relational DBMS's do not provide appropriate data objects, such as matrices and vectors, data scientists often rely on hand-written and highly specialized solutions. But rather than being responsible for maintaining hardware-dependent solutions, many scientists would prefer to work on a more conceptual level. A DBMS with integrated support for matrices as first class citizens could serve as a framework for scalable linear algebra queries, and supersedes the need for copying data to an external algebra system.

The integration of linear algebra operations into the database system may impose one or more conditions. One possible condition is an avoidance of data transfer. Specifically, with the data persisted and kept consistently in a single database system with integrated linear algebra functionality, the expensive copying into external systems becomes dispensable.

Another condition is for a single source of truth. In particular, the absence of redundant copies of data in external systems avoids data inconsistencies. Moreover, the corresponding meta data of data sets can be updated synchronously and consistently with the raw data.

Still another condition is efficient implementation. Data scientists seek a system that is able to compete with existing high performance systems, which usually are optimized for the platform hardware. Efficient algorithms for linear algebra have been researched and can be referenced. Carefully tuned library algorithms can be reused as a kernel for medium-sized matrices. Herein, medium-sized matrices are referred to as data volumes which fit into the memory of a single machine.

Yet another condition is manipulation of data. In several analytic work flows, large matrices are not static objects. Single elements, rows, columns, or matrix subregions should be able to be read, updated or deleted by the user.

Another condition is a standardized user Application Program Interface (API). Users from science environments desire to have an declarative and standardized language for matrix manipulation primitives and linear algebra operations.

To address these conditions, an architecture for sparse matrices is presented that integrates with a column-oriented in-memory DBMS, and provides an application interface allowing work flows from science and business environments to be run efficiently.

Embodiments may include one or more of the following characteristics. One characteristic is a mutable sparse matrix architecture. A matrix architecture with a columnar layout is presented by taking advantage of well-known, ordered sparse matrix data structures. Moreover, a two-layered main-delta storage can be exploited to provide dynamic matrix manipulation in constant time, without being penalized by a reordering of the optimized main matrix representation.

Another characteristic is the matrix application interface. Similar to the data manipulation language of transactional, relational systems, embodiments provide an application interface to access and manipulate matrices.

Another characteristic is applicability to non-numeric use cases. Relational tables can be reinterpreted as sparse matrices, and analytical queries can be rewritten to exploit efficient linear algebra algorithms.

Described further below is an implementation of different matrix representations, and evaluation of the performance of the architecture against alternative approaches using real world applications of science and network graphs.

Figure 13:
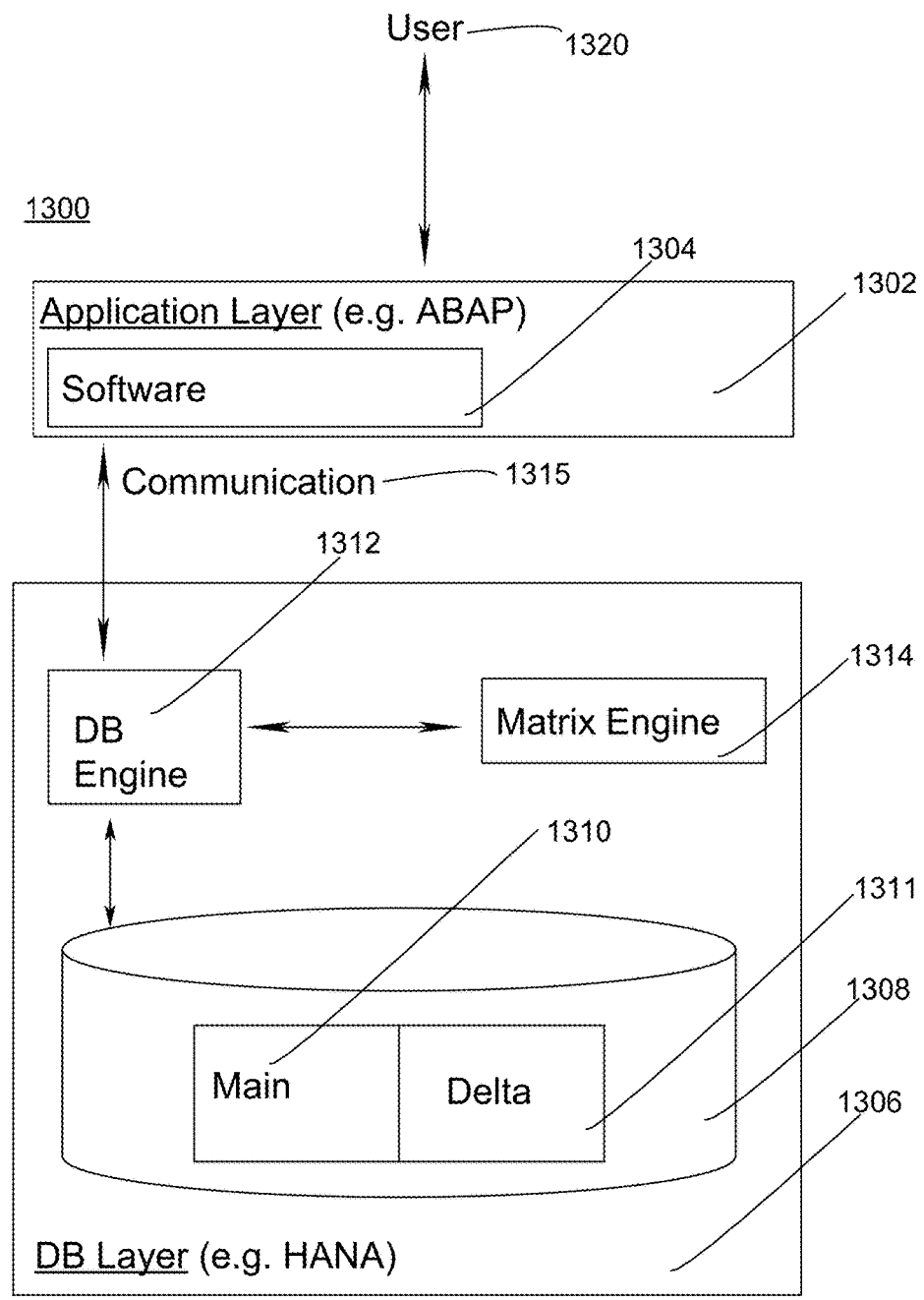
FIG. 13 illustrates a system configured to perform linear algebra according to one embodiment.

FIG. 13 shows a simplified view of a system 1300 configured to perform linear algebra according to an embodiment. Application layer 1302 provides the environment supporting operation of a software program 1304, such as a financial (FI) planning platform. One example of such software is Enterprise Resource Planning (ERP) software available from SAP AG of Walldorf, Germany.

The software program resident within the application layer, is designed to access and manipulate (e.g., perform linear algebraic operations upon) various types of data present in a database (DB) layer 1306. The application layer then presents that data and/or the results of the manipulation to a user 1320.

In particular, that database layer may comprise a non-transitory computer readable storage medium 1308 having an in-memory database stored thereon. The database layer further comprises an in-memory database engine 1312 that is configured to govern interaction with the underlying database structure.

As shown and described in detail in connection with FIG. 4 (below), particular embodiments may employ a storage architecture in which columns are separated into a static main structure 1310 that is compressed and read-optimized, and an incremental delta structure 1311 that is write-optimized. The delta storage is periodically merged into the main storage that includes a reorganization that sorts the columns After this sorting, an index (e.g., CSR index) is created. The index is then referenced by the matrix engine to perform an algorithm comprising an algebraic operation.

The database layer further comprises a Matrix Engine 1314. As described in detail below, in response to communications 1315 with the application layer, the matrix engine is configured to perform linear algebra operations upon data stored in the database layer.

Figure 13A:
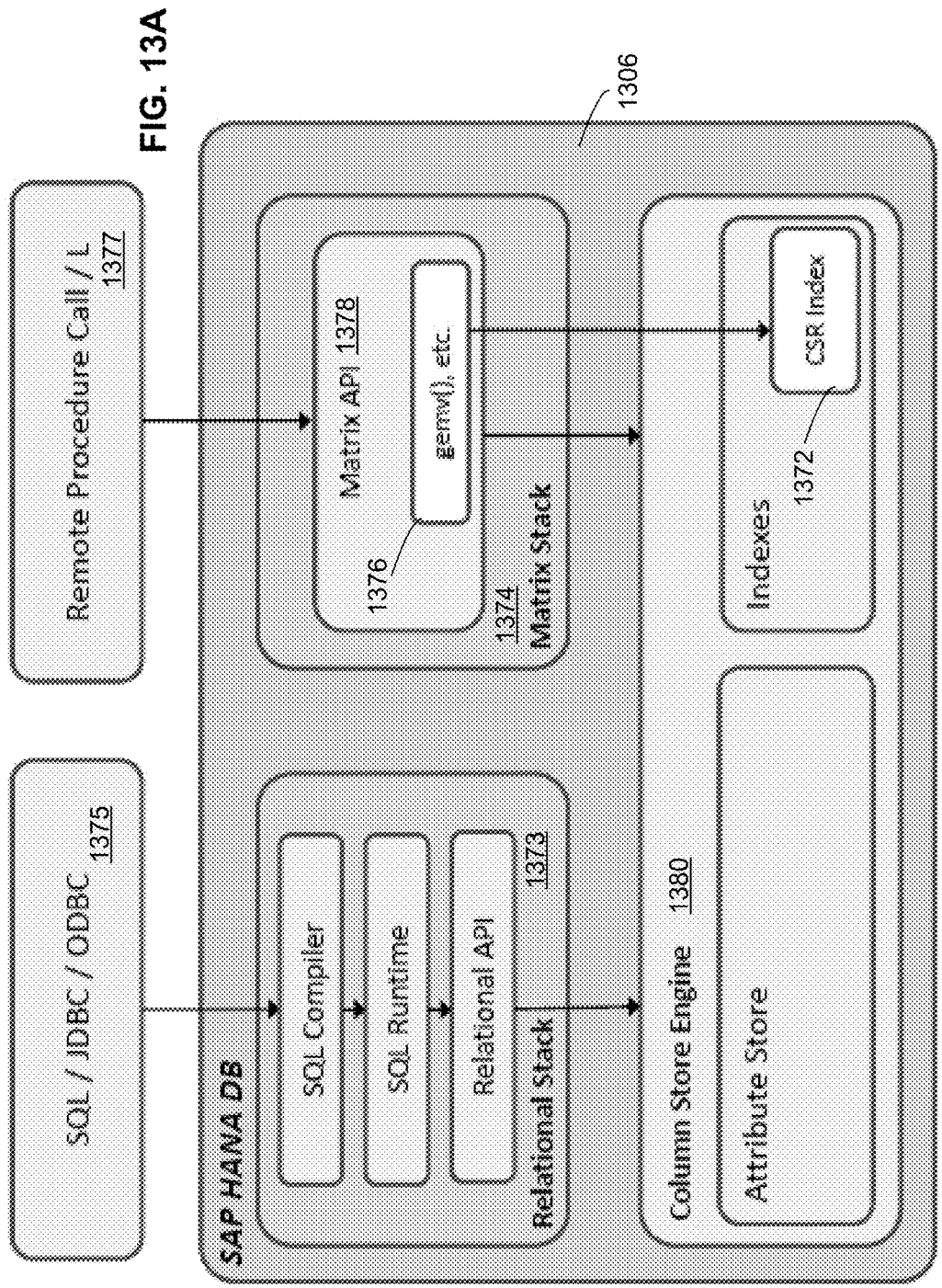
FIG. 13A shows an enlarged view of a database layer according to an embodiment.

In particular, FIG. 13A shows an enlarged view of an embodiment of an in-memory database layer, in this particular case the HANA in-memory database available from SAP AG of Walldorf, Germany. This database layer 1306 comprises the matrix data in the form of a Compressed Sparse Row (CSR) index 1372.

FIG. 13A shows the database layer as comprising a relational stack 1373 receiving inputs 1375 as SQL, Java DataBase Connectivity (JDBC), or Open DataBase Connectivity (ODBC). The relational stack comprises a SQL Compiler, SQL runtime, and relational application program interface (API).

The FIG. 13A moreover shows a Matrix Stack 1374 that is configured to receive inputs 1377 in the form of a Remote Procedure Call (RPC) from the overlying application layer. This Matrix Stack 1374 comprises an engine that is aware of the matrix-structure and includes several algorithms. One of these algorithms is for general matrix vector multiplication (gemv) 1376. The matrix engine further exists with the corresponding application program interface (Matrix API 1378) for creating a matrix table and the gemv algorithm.

FIG. 13A furthermore shows the CSR index 1372 as being part of the column store engine 1380. This column store engine works as part of the in-memory database engine independently from the MatrixEngine/API, to provide functionality of the HANA in-memory database.

While the above FIG. 13A shows one specific in-memory database layer implemented as the SAP HANA database, this is not required. Other types of in-memory databases are known, including but not limited to the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

Figure 13B:
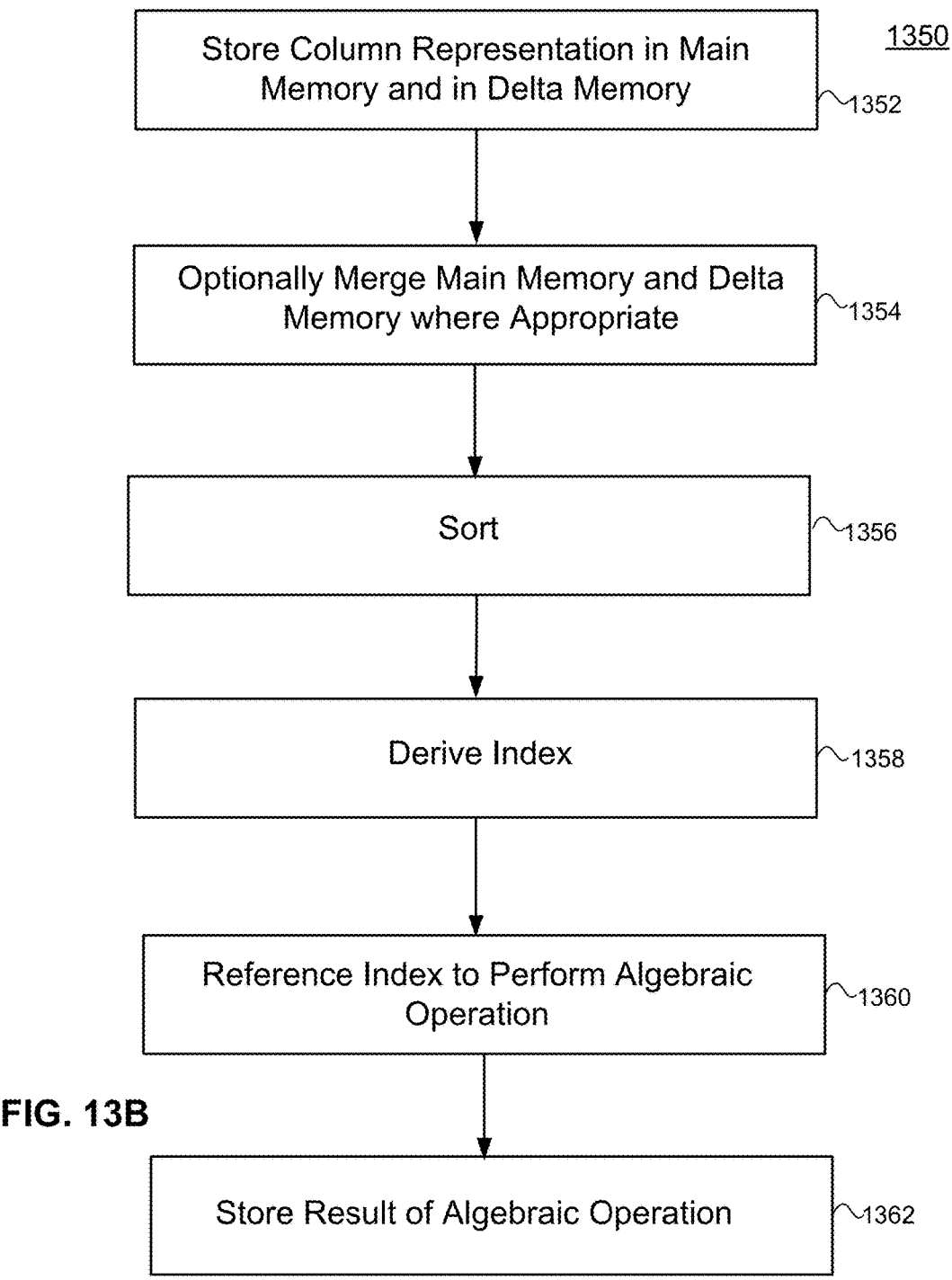
FIG. 13B illustrates steps of an embodiment of a method of performing linear algebra according to an embodiment.

FIG. 13B is a simplified flow diagram showing steps of a process 1350 according to an embodiment. A first step 1352 comprises creating a representation of a matrix as three columns (each for row, column coordinates and the value), and storing the columns in a read-optimized main memory structure, and incremental updates in a write-optimized delta memory structure.

A second step 1354 comprises optionally merging the delta memory structure into the main memory structure when appropriate. An example of when such merger occurs is where the delta size exceeds a certain threshold that may be defined in the system.

A third step 1356 comprises sorting the columns by values of the row column. A fourth step 1358 comprises deriving an index that exploits the sorting.

A fifth step 1360 comprises performing an algebraic operation referencing the index. A sixth step 1362 comprises storing a result of the algebraic operation.

Embodiments are now further illustrated and described in connection with the following examples. These examples are illustrated in conjunction with FIGS. 1-9D.

The matrix storage architecture is first discussed. This aspect addresses the architectural question of how a large sparse matrix should be represented in a columnar database system. Therefore, different columnar data structures for matrices are considered with regard to their integrability into an in-memory DBMS.

The challenge of many analytical database systems (which strive for both quick query execution and immediate updates), is the dualism of read- and write-optimized structures. The representations are examined according to the following two criteria: optimization for read access and the complexity of manipulations, i.e. the mutability of the data structure.

Since these opposed characteristics are unlikely to be achieved by a single structure, a main-delta approach is employed. This relies upon separation of an abstract storage layer into two different physical representations—an optimized (compressed) static and a mutable delta structure.

At least four different representations for matrices may be considered with respect to their applicability in the main-delta architecture. One representation is the matrix table.

A straightforward way of storing matrices in a RDBMS is to translate matrix rows to table rows and matrix columns to table columns. This approach results in a m×n-sized table for a m×n matrix, as shown in a) of FIG. 1. In a column-oriented DBMS this would be reflected as n separate column storage containers. However, this representation often reaches its limitations if matrices are very wide, since the number of table columns in common DBMS's is usually restricted. The apparent advantage (that the matrix table representation is intuitive because it preserves the logical two-dimensionality of a matrix) loses its justification when the matrix size grows to an extent where displaying the matrix interactively is simply not feasible anymore.

Moreover, the matrix table is a dense representation, which makes it unusable for sparse matrices, unless the individual columns are compressed. Compressing the individual columns would decrease memory consumption, but usually adds the decompression to the algorithm execution runtime. The advantage of individual column compression in conventional business tables becomes superfluous as the columns of a matrix tend to be of similar structure.

Another representation is the single value column Specifically, another way of representing a matrix is to put every value (including zeros) adjacently into one large, consecutive value sequence. This translates into a single table column, shown as b) in FIG. 1. This internally results in a large value container. To avoid misunderstanding with a matrix column, container refers to the storage structure for a column in a column-store DBMS.

For this representation, a 2D to 1D linearization is needed. This mapping is implicitly performed on regular 2D-arrays in most programming languages, since the memory is sequentially addressable either way. Embodiments may use a row-by-row sequence, which is effectively a linearization according to the row-major order. The position of each matrix element in the sequence can be calculated using its 2D coordinates and the matrix m×n dimensions, i.e. the position of an element (i, j) in the sequence is i·n+j. The advantage of this uncompressed representation is that reads and writes are of constant complexity, whereas the disadvantage lies in the static memory consumption of O(m·n), independent of the sparsity of the matrix.

It should be mentioned that the single value column representation is clearly not relational, since positional referencing within a single table column elements is usually not supported and contradicts the relational thought of having an unordered set of relations. However, it is assumed that a logical layer for addressing single matrix elements in the DBMS exists, and the uncompressed 1D array representation is used as a comparison measure in the evaluation.

A third way of representing a matrix is as a collection of triples. This is shown as c) in FIG. 1. Each triple contains the row and column coordinate, and the value of the corresponding matrix element: <row, col, val>. The row and col attributes form a composite primary key, thus duplicate matrix elements are avoided. This variant turns out to be effective if the matrix is sparse, because only the non-zero elements have to be kept and the order of the rows is generally arbitrary.

In a column-oriented database, this triple table is represented as separate containers in the storage layer. Each of the containers has the length $N_{nz}$ which is equal to the number of non-zero matrix elements, resulting in a total memory consumption of $O(3N_{nz})$. To find an element in the unsorted, not indexed triple table a full column scan ($O(N_{nz})$) is required. The insertion of additional non-zero matrix elements is performed in constant time as they can just be appended to the end of the respective physical container, which makes the triple representation suitable as delta structure in our architecture. Further compression of the triple table can be achieved by sorting it according to one of the coordinates. The thereby resulting adjacent chunks of identical numbers in the corresponding container can then be compressed. This, however, influences the update and algorithmic behavior, so that the compressed format is considered as a separate representation.

Figure 2:
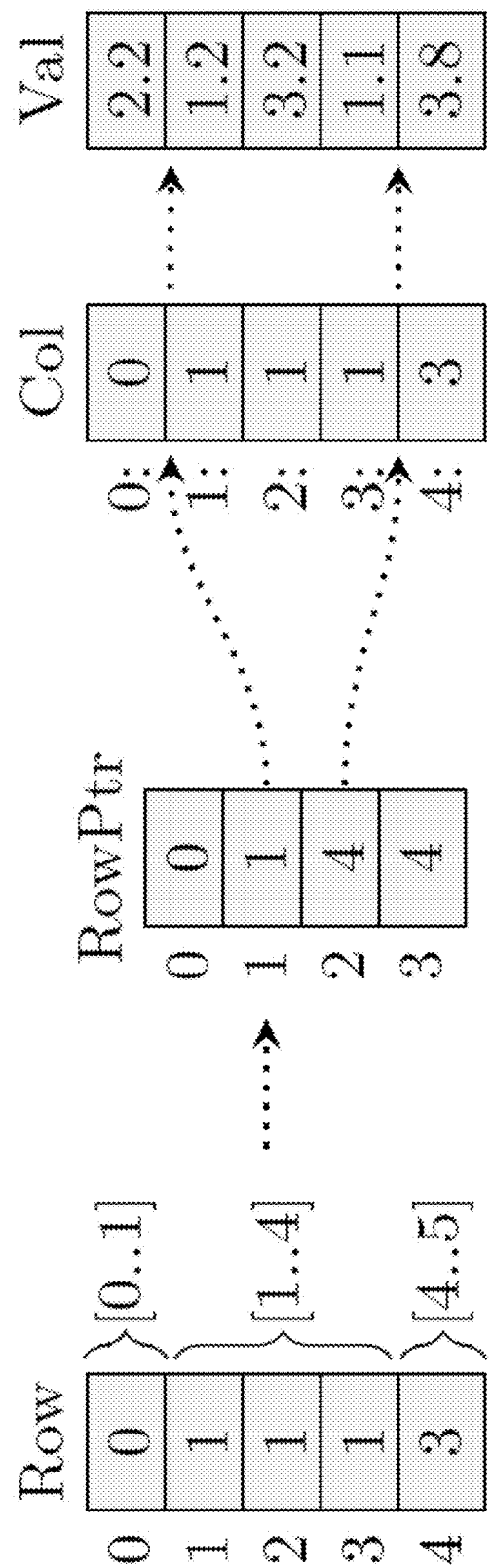
FIG. 2 shows the CSR representation, with compression of the row container shown at left, and the row pointer vector (RowPtr) shown at right. The access path to the first matrix row is sketched.

Still another possible representation is the compressed sparse row and compressed sparse column format that are sparse matrix structures in the numerical algebra community. For the sake of simplicity, this description is confined to the CSR representation of FIG. 2. The CSC representation of a matrix A is equal to the CSR representation of the transposed matrix $A^T$, and vice versa. The CSR representation is effectively a compression of the row-major-ordered triple representation. The row-major order allows replacing the row container by a row pointer vector (RowPtr) which contains only the start positions of each matrix row, as shown in FIG. 2. The central characteristic of the row pointer vector is that it also acts as an index, since a look-up for a row coordinate value provides the physical positions of the matrix row in the remaining containers of the triple table. As an example, to get all elements of the first row, every triple from the row start position RowPtr[1] up to the end position RowPtr[2]−1 is returned. The row pointer vector of an m×n matrix has thus the size m+1, where the $(m+1)^{th}$ element denotes the end position of the $m^{th}$ row in the column and value containers. The total memory consumption is $O(2N_{nz}+(m+1))$, thus usually less than that of the triple format, because the inequation $(m+1) \leq N_{nz}$ is only violated if the matrix contains rows of zeros.

In the original CSR implementation, the materialized row container is discarded and replaced completely by the row pointer vector. As contrasted to the uncompressed triple representation, the complexity for the inverse access (i.e., finding the row coordinate x to a table position i) is not constant. For this operation the interval of the start positions $I:[I_V; I_{V+1}]$ where i∈I has to be determined. However, this can be easily performed using a binary search in an asymptotic complexity of $O(\ln(m+1))$, as the row pointer vector is sorted. In contrast to many naive conventional compression techniques that are used columnar stores, a partial or complete decompression of the row pointer vector is not necessary. The row access in $O(1)$ and the (average) single element access in $O(\ln\sqrt{N_{nz}})$ time makes it a reasonable choice for our static main storage structure.

The impact of the linearization order is now discussed. As the linearization order plays an important role in most of the abovementioned representations, it may be recognized that certain algorithmic patterns favor certain orders. The row-major and column-major ordering are biased linearization techniques. For instance, a row-major order would not be chosen as internal layout when it is likely that complete columns are accessed. A single column iteration translates into a jump memory access pattern on a row-major order, since the addresses are separated by the row width and spread over the complete memory section, whereas it yields in a cache-efficient, locally restricted and sequential memory scan on a column-major order. Although there are nonbiased linearizations, such as the recursive Morton order or the Hilbert curve, they exhibit poor cache locality for one-directional algorithmic patterns, e.g., BLAS level 2 operations.

Furthermore, the linearization order defines the compression either CSR (row-major) or CSC (column-major). With the row pointer vector as index, algorithms with a row-centric pattern obviously benefit from a CSR structure whereas column-centric algorithms would favor a CSC-based approach. This introduces a bias in algorithmic performance, but the majority of algorithms are usually one-directional, i.e., they can be expressed in a way that accesses only one of the two dimensions. Examples are the matrix-vector multiplication or the graph breadth-first search, discussed below. However, if an algorithm favors a CSC structure, but the matrix is available in CSR representation, then often an alternative algorithm working on the transposed structure can be used, since $A_{CSR}=(A^T)_{CSC}$.

Nevertheless, in contrast to the sole use of numerical libraries or common algebra systems, where the user is required to define the matrix representation in advance, and has to be aware of the algorithmic access and manipulation patterns, a DBMS that accommodates query statistics can act as advisor to reorder the matrix representation.

System Architecture is now discussed. In particular, an approach for supporting mutable sparse matrices integrates with a column-oriented DBMS. In particular, the mutability of large matrix data sets (a condition described above) is provided without losing the advantage of optimized storage structures. Moreover, the efficient indexing method of the CSR representation can be exploited by arbitrary tables, when integer dictionary-encoding is used.

It is noted that the following data structures of our architecture are contained in RAM. In particular in sparse linear algebra, random access patterns are usual, which becomes clearer in sketching example algorithms below. For not being penalized by hard disk accesses, a main memory database environment is chosen which does not pose a limitation, since recent in-memory systems are reaching storage scales of 1 TB and more.

In recent DBMS's the storage architecture of each column is separated into a static main structure compressed and read-optimized for online analytical processing (OLAP), and an incremental delta structure write-optimized for online transactional processing (OLTP). The delta storage is merged into the main storage periodically, and each of these merge steps includes a reorganization, the original purpose of which is to improve the compression ratio by reordering the table rows. Here, according to embodiments the reorganization is exploited to sort the columns by their values. This step is transparent to the user and can be implemented in a way so that online query execution performance is not affected. The internal algorithms are usually dependent on the representation and are therefore executed separately on the main and the delta storage.

The static main component is now discussed. The static main component contains a data representation that is optimized for read operations, and moreover to the patterns of sparse matrix algorithms. The evaluation which follows later below, shows that a CSR (CSC) representation turns out to be beneficial in a variety of use cases, especially in the applications which are related to the sparse matrix-vector multiplication. Besides its efficiency and applicability in many numerical libraries, the CSR representation integrates well into a column-oriented DBMS, since the row pointer vector is at the same time both an index for the triple table and the compressed version of the row container itself.

The CSR representation, and thus the derived CSR index (the CSR index corresponds to the row pointer vector) are not limited to applications with matrices. Every database table accommodating a relation $R=\{a_1, a_2, \ldots\}$ of at least two attributes and arbitrary values, except the null value ($a_i \neq NULL$), can be transformed into an internal CSR structure, if the values are translated into subsequent integer values. Embodiments may employ a column-store DBMS that uses by default dictionary encoding for every column in order to reduce the memory consumption and improve the scan performance, since table values in business environments are predominantly reoccurring strings. Thus, each table value of arbitrary format is assigned an integer id $\in \{0, 1, \ldots, n_{values}-1\}$, so that only the integer value IDs are materialized and kept in the containers. This circumstance allows for creating a CSR-based representation for a large group of use cases.

Figure 3:
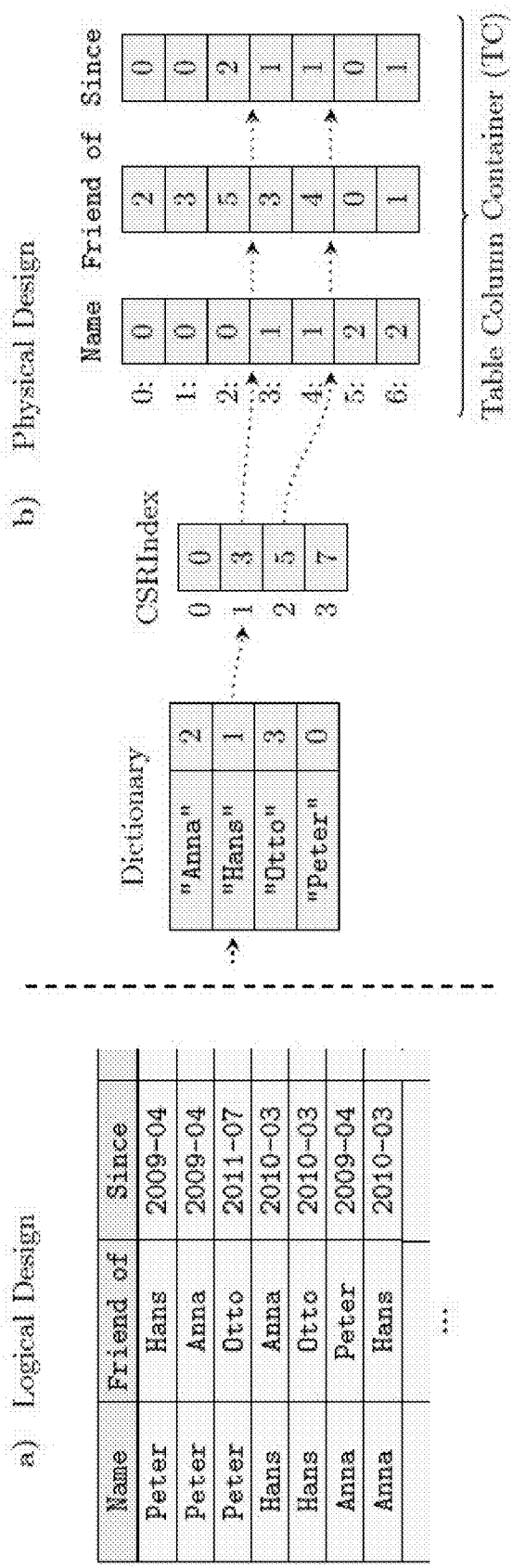
FIG. 3 shows a social network graph table and the dictionary-encoded columnar storage architecture.

The dictionary encoding is sketched in FIG. 3, which shows the internal database representation of a social network table that contains string and date values. The left portion a) shows the logical view of the table in the database with two attributes (Name, Friend of) that denote the graph topology, and an auxiliary attribute (Since). The right portion b) shows the internal representation that comprises dictionaries and integer columns.

The dictionary of the Name attribute is sorted in ascending order by its values, which are then assigned consecutive integers, starting with zero. As a result, the materialized container for a table column comprises only integer values. The single precondition for the applicability of CSR-based representation according to embodiments, is the ordering of the table. The sorting of every container in the corresponding table according to the value ids of the leading attribute, which is Name in FIG. 3 and Row for a matrix table, is performed during the reorganization step following a delta merge. After sorting the table, the CSR index is created.

In the original form of CSR a two-level nested sorting is used to achieve a strictly row-major ordering of a two-dimensional matrix. The sort order is first by row, then by column values. However, the latter is not required to create the CSR index, although a subordering of the column leads to an increased algorithmic performance. This can be explained by cache effects: during a matrix vector multiplication, the column coordinates refer to positions in the target array. If they were randomly ordered, many cache-lines would have to be evicted and reloaded again, whereas an ascending order leads to cache-friendly writes.

The incremental delta component is now discussed. The sorted characteristic of the optimized CSR representation makes it a static structure that is not mutable in constant time. Hence, in common numerical algebra work-flows the representation has to be rebuilt after manipulating the matrix, even for slight changes like the single insert of an additional nonzero matrix element. This results in a O(N ln N) sorting overhead that becomes particularly expensive for very large matrices in a dynamic workload.

Figure 4:
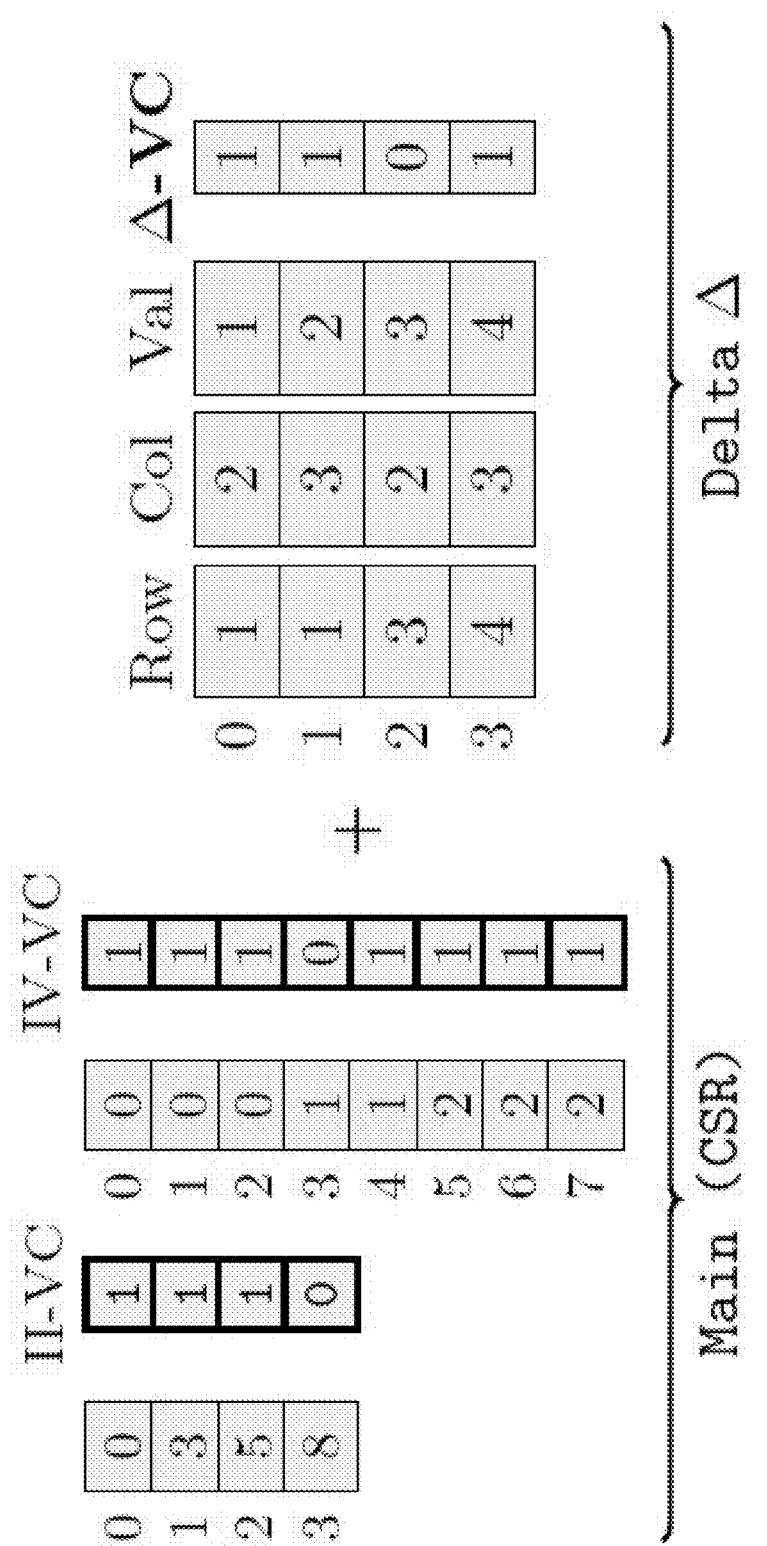
FIG. 4 shows a column-oriented architecture containing a static main and an incremental delta structure.
Figure 6B:
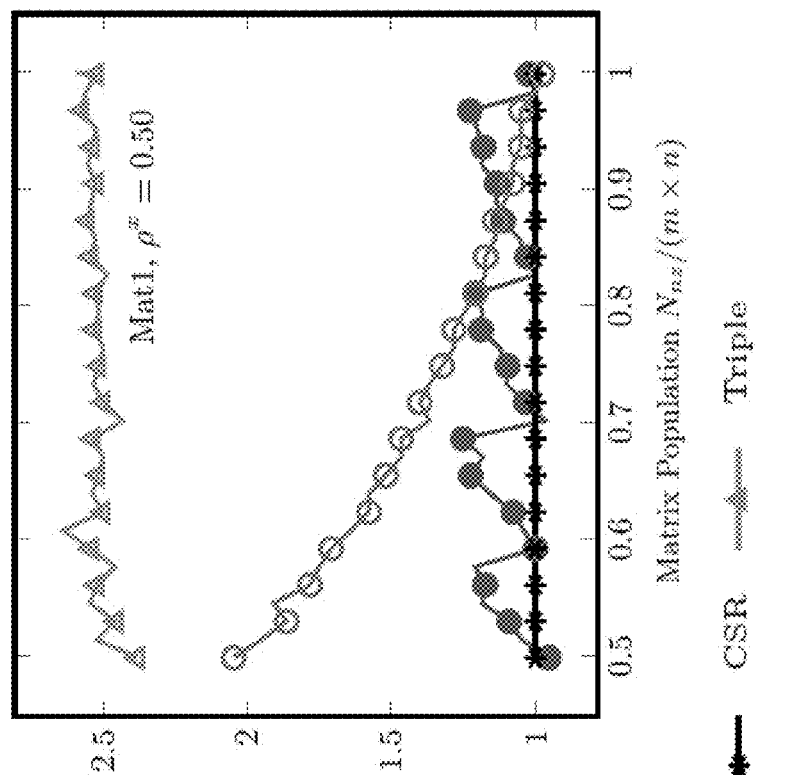
FIGS. 6A-6F show for the algorithm of FIG. 10, runtime performance comparison of the main-delta architecture against static CSR, a pure triple table and a dense array using different matrices and x-vectors with a varying population density $\rho^x$. For each plot, the corresponding sparse matrix was filled with nonzero elements between consecutive query executions, which results in an increasing matrix population density along the x-axis. The delta merge threshold was set to deltaT=15%.
Figure 6A:
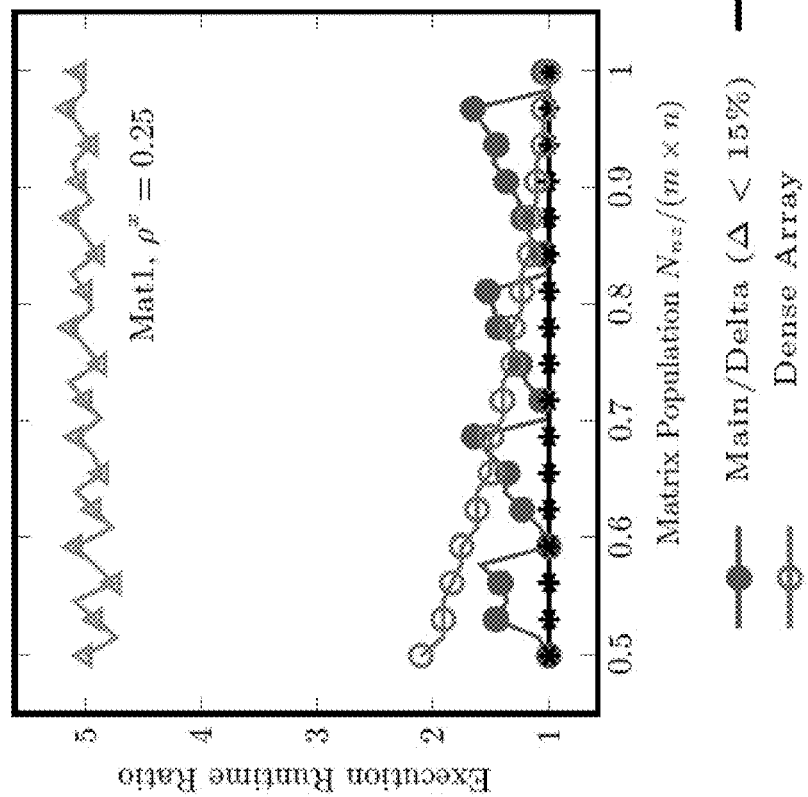
Figure 6D:
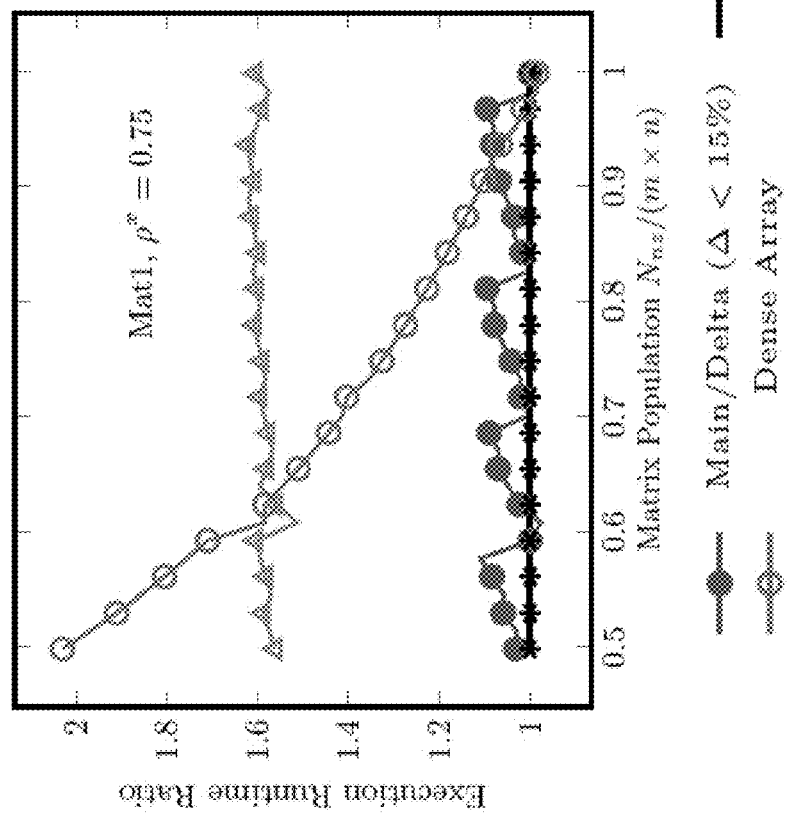
Figure 6C:
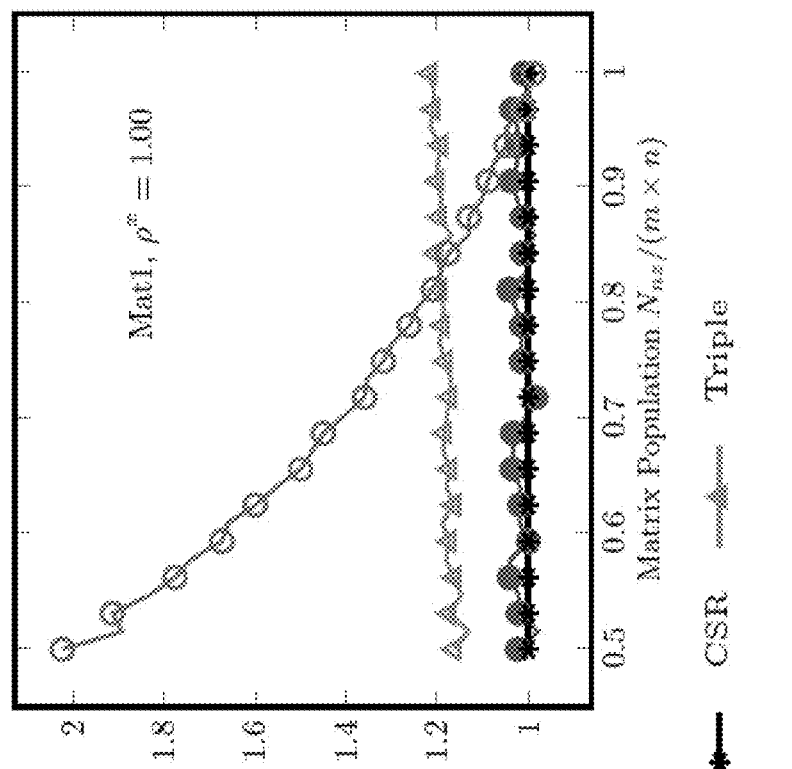
Figure 6F:
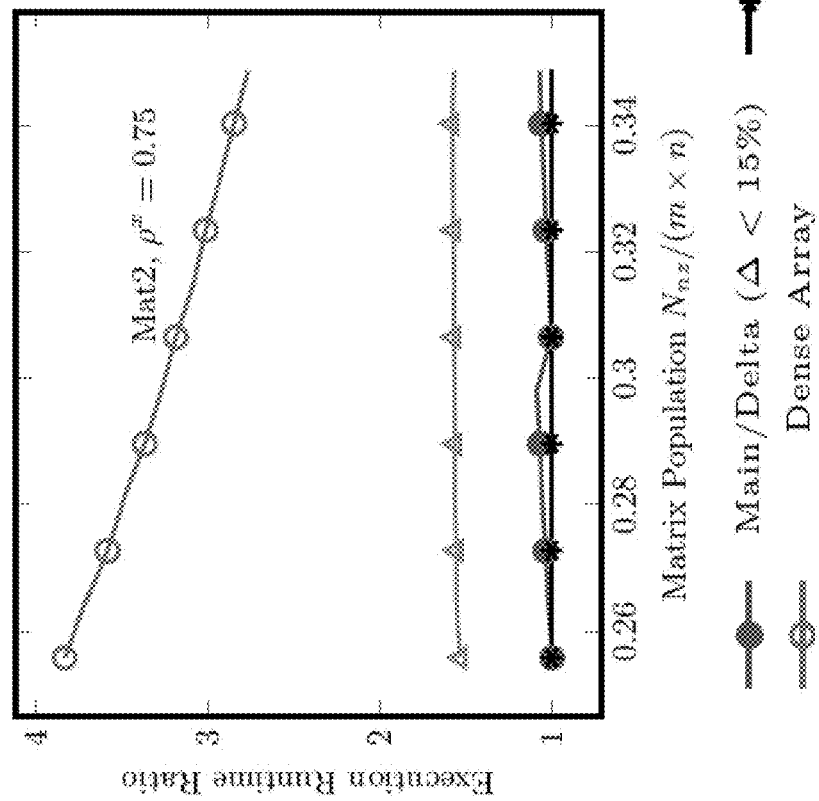
Figure 6E:
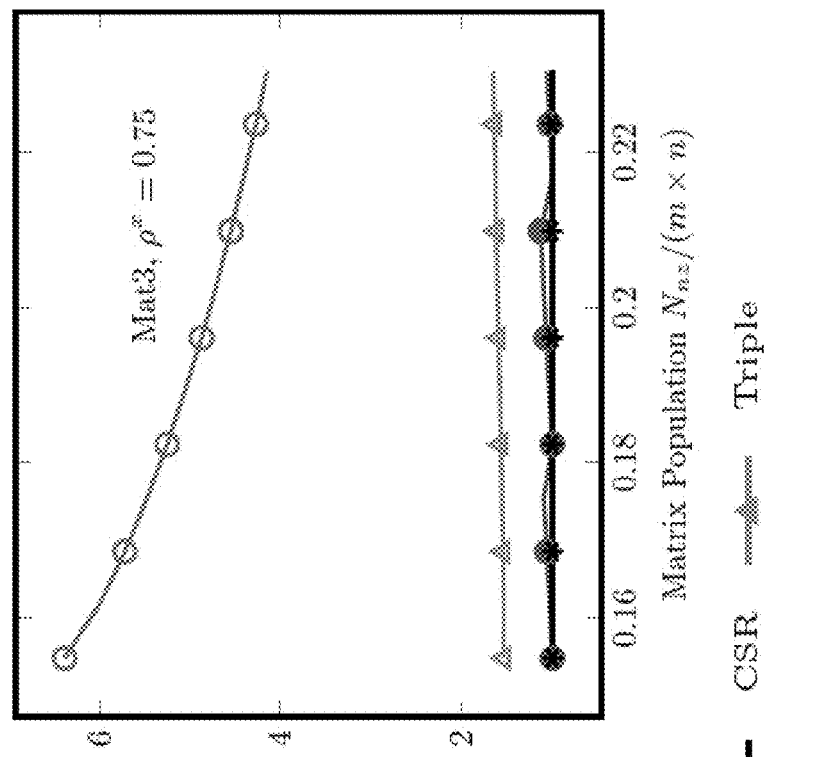

Thus, the architecture as shown in FIG. 4 foresees an updatable, incremental delta structure that coexists with the static main structure.

Inserts of non-zero elements are processed by simply appending a <row, col, val> triple to the unsorted delta structure. Updates of already existing nonzero elements are performed in-place, i.e., either in main or delta. For a single element update, this requires a binary search on the column container on the main and a scan on the delta structure, thus on average $O(\ln \sqrt{N_{nz}^M} + N_{nz}^\Delta)$ time.

Deletions of elements require an additional structure to keep track of the deleted elements. For this purpose our architecture contains validity control (VC) bitvectors for the main table, the CSR index and the delta structure. For every deleted element, the bit of the corresponding container position in the respective main (II-VC) or delta bitvector (Δ-VC) is unset. Moreover, if a complete matrix row is removed, for instance row k, then the corresponding bit at position k of the IV-VC bitvector is unset.

The matrix application interface is now discussed. In classical database workloads, tables are commonly manipulated dynamically by inserting, updating or deleting data elements. However, the dynamic characteristic of relational database workflows also holds for large sparse matrix applications, as described for the nuclear science use case below. Hence, it is a valid assumption that sparse matrices are not just queried in a single-pass, but rather modified in-between subsequent query executions as part of an analytical workflow (e.g. the nuclear energy example below). Therefore, embodiments offer the user an interface with which sparse matrix data can be manipulated in a similar manner as relational tables with data manipulation language (DML) commands.

Basic manipulation primitives for matrix data are now discussed from a logical perspective, and also what an application interface could look like. According to embodiments, a database system contains matrices as first-class citizens, for instance by extending SQL with a matrix data type. Thus, matrices are defined in the data definition language (DDL) as such with the specification of its dimensions, which are stored as metadata in the system. The following application interfaces can then be exposed as built-in procedures that process matrix data types.

Figure 5:
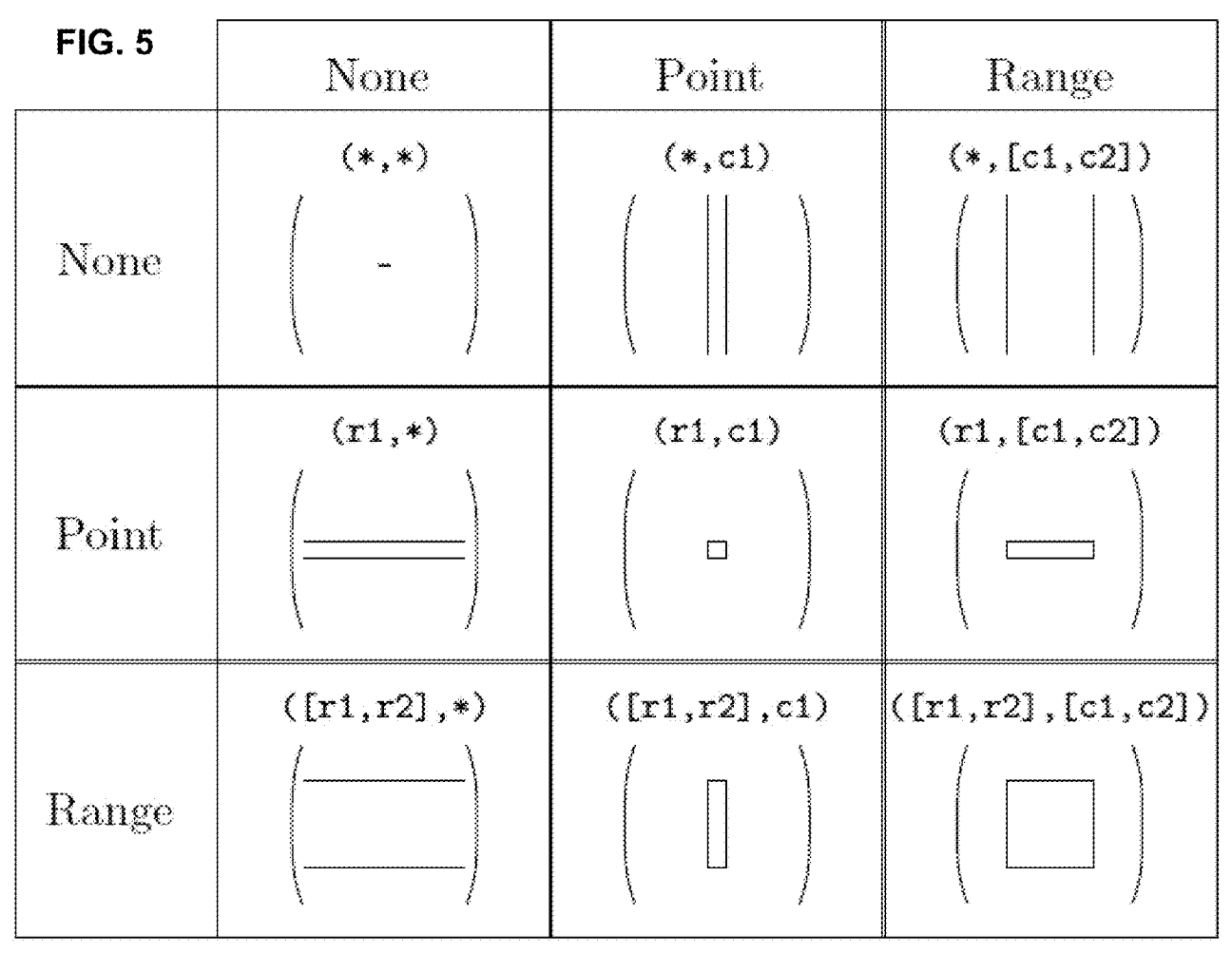

Access Patterns are now discussed. As a basis for the following algorithms and examples, the application programming interface for referencing matrix elements and regions is briefly introduced. Each of the two matrix dimensions can be queried by providing either a point, range or no restriction. Based on this assumption, a subarray referencing matrix is shown in FIG. 5.

To fetch single elements or matrix subregions the command get: is defined. This get: is the counterpart of the relational select . . . where statement, where the filter condition is replaced by a topological reference according to patterns shown in FIG. 5. For example, get A(5,3) returns a single matrix element, get A(*,3) references the third column and get A(1,*) the first row of matrix A. Two-dimensional submatrices are returned by defining their row and column range, such as get A([2,5],[3,5]) to retrieve the rectangular region between the edge elements A(2,3) and A(5,5). The complete matrix is referenced by providing no restriction in both dimensions, thus A(*,*).

Data manipulation primitives are now discussed. From the relational SQL perspective, the DML comprises commands to insert, delete, and update elements. The difference to a logical matrix context is that every single element of the matrix space m×n does in fact exist, independent of its value, including zero elements. Thus, there is no other interpretation of inserting a single matrix element than updating the already existing zero element of the matrix at the corresponding position. In the same way a deletion of a single element is rather described as setting the nonzero value to zero. However, if a complete row or column, or a submatrix is inserted with dimensions of either m×k or k×n, then an insert can also be interpreted as an expansion of the matrix by k rows or columns, respectively. In a similar manner, a deletion of regions spanning the whole row- or column range can be seen as an effective shrinking of the matrix. To remove this ambiguity, the following commands are defined.

The set: command sets any single element or region in the matrix space m×n and overrides the previous value of the corresponding matrix region. As an example, set A(9,3) value 5.0 sets a value at position (9,3), whereas set A([2,2],[3,3]) values (0.0, 0.0, 0.0, 0.0) sets all the values of the square submatrix to zero.

The delete: command only applies to either a m×k (k rows) or a k×n (k columns) subregion of the corresponding m×n matrix. It affects the matrix dimension in such a way that the adjacent parts are shifted to the first free place which was formerly populated by a deleted row/column. Thus, the resulting matrix has either the dimension of (m−k)×n or m×(n−k), respectively. For instance, delete A(*,3) executed on a 4×4 matrix A deletes the third column which changes the dimensions of A to 4×3.

The insert: command is the logical counterpart of the delete operation. The insertion of either k rows or k columns results in matrix dimensions of either (m+k)×n or m×(n+k).

The copy: command copies single elements, complete rows, columns or submatrices from any source position to a target position. If the target position exceeds the matrix bounds, then the copy operation only applies to m×k or k×n subregions. The overflowing rows or columns then affect the matrix dimension in the same way as an insert. The copy operation is derived by a consecutive get and set operations, if the target position stays within the matrix bounds, and by a get and set/insert operation if the target position exceeds the matrix bounds.

The flip: command exchanges a k×l subregion from a source position to a target position, which must not exceed the matrix bounds. The flip cannot be implemented solely by consecutive get and set commands, since either the target or source region has to be buffered temporarily.

Next to these basic commands, a variety of further operations can be defined, such as transpose. However, manipulations of a sparse matrix, such as insertion of elements, is not foreseen in common algebra systems such as Matlab. By contrast, they can be integrated into matrix architectures according to embodiments as described herein. Setting single elements in a matrix is a fundamental operation in a variety of applications, for example in LU-decomposition methods, such as Gaussian Elimination or the Doolittle algorithm. Moreover, some analytical workflows tend to remove complete matrix rows or columns. In the example from nuclear science described below chunks of k rows and columns are deleted from the sparse matrix. Other examples are graph algorithms, where the elimination of a graph vertex corresponds to the removal of the adjacency matrix row (and the respective column).

Now discussed are two sparse matrix applications from different domains. It is shown how they can be run on the columnar main-delta architecture Implementation of the sparse matrix-vector multiplication internally used as a kernel is described in the following two examples. A first example is the Lanczos algorithm for numerical eigenvalue calculation, taken from a theoretical nuclear physics analysis. A second example is an inclusive breadth-first search on network graphs.

Sparse matrix vector multiplication is now discussed. Let:

$$y = A \cdot x$$

be a matrix-vector multiplication with $x \in R^m$ and $A \in R^{m \times n}$. For illustrational purposes consider the transposed equation:

$$y^T = x^T \cdot A^T$$

which can be written as follows.

$$y^T = (x_1 \; x_2 \; x_3 \; \ldots) \cdot \begin{pmatrix} A_{11} & A_{12} & A_{13} & \\ A_{12} & A_{22} & A_{23} & \ldots \\ A_{13} & A_{23} & A_{33} & \\ & \ldots & & \end{pmatrix}$$

-continued $$y^T = x_1 \cdot (A_{11}\ A_{12}\ A_{13}\ \ldots) +$$
$$x_2 \cdot (A_{21}\ A_{22}\ A_{23}\ \ldots) +$$
$$\ldots$$

From a implementational perspective, the linearity of the operation allows the independent, sequential processing on the main-delta data layout. With $A=A^M+A^\Delta$, one obtains the superposition $$y^T = x^T \cdot (A^M + A^\Delta)^T = \underbrace{x^T \cdot A^{M,T}}_{①} + \underbrace{x^T \cdot A^{M,T}}_{②}$$

Implementation for the multiplication based on a main-delta architecture is sketched in the algorithm of FIG. 10.

The first part of the code (line 4-13) is a sparse matrix vector multiplication using the CSR index. For each nonzero vector element $x_i$, a index lookup for the corresponding matrix row i provides the start and end position of the containers in the main structure. Moreover, the II-VC bitvector is checked for each $x_i$, in order to skip the meanwhile deleted matrix rows. The same check has to be performed in the inner loop for each element using the IV-VC bitvector before the target vector y is written.

The second part (line 14-17) of the algorithm of FIG. 10 iterates over the valid elements of the incremental delta structure and adds the product results to the respective element holder in the target vector. It is noteworthy that by using this implementation, neither the first nor the second part of the algorithm of FIG. 10 requires a search scan in contrast to naive column store approaches.

EXAMPLE 1

Nuclear Energy State Analysis

Here, a workflow from theoretical nuclear physics is used as a benchmark in the evaluation. In this analysis, the energy states of an atomic nucleus are determined by an eigenvalue calculation of a large, sparse Hamiltonian matrix which stems out of a preprocessed nuclear physics theory simulation. The eigenvalue calculation is based on the Lanczos method sketched in the algorithm of FIG. 11.

The getEnergyStates procedure resembles an importance truncation method. The dots denote pre- and postprocessing steps of the analysis (details of which are omitted here to outline the interface calls to the database system). A part of the analysis is a quantum state selection sketched via the selectDel call, which returns the coordinates of the matrix row- and columns that are selected for truncation. Since the Hamiltonian matrix is symmetric, the operation comprises the deletion of row-columns pairs which is executed by calling the delete command of the matrix interface (line 5). After the deletion, the lanczos function is called again. These two steps are repeated until a goodness criteria is achieved. Finally, the resulting eigenvalues λ were returned, which refer to the nuclear energy states.

The lanczos function itself is an iterative method, which effectively comprises a matrix-vector multiplication (line 11) and an update part (line 12). It processes the resulting vectors and forms an orthonormal basis of the eigenspace. Here, the bottleneck of the Lanczos function is the matrix-vector multiplication in line 11, which in this case is a call to the algorithm shown in FIG. 10.

EXAMPLE 2

Breadth-First Search

Queries on relational data from a non-numeric environment (especially with a graph-like topology), can be evaluated by exploiting a sparse matrix architecture according to an embodiment. As an example an inclusive breadth-first search is described. It is inclusive, because it returns all vertices that are discovered on paths with a length up to a certain traversal depth. However, this does not pose a restriction, since the algorithm can be rewritten in such a way that exclusively paths of a certain length are returned.

The breadth-first search is inherently similar to a matrix vector multiplication (the algorithm of FIG. 10), which is explained by the dualism between a graph and its adjacency matrix.

FIG. 3 shows an example table that represents friend connections of a social network graph. It sketches two attributes Name and Friend-of which denote the start and the target vertices of the graph, and thus the sparse adjacency matrix. Furthermore it contains an additional attribute Since, but we want to emphasize that the table may contain an arbitrary number of additional property attributes since they have no effect on the leading topological attributes. A common query on such a social networks table would for instance be: 'who are the friends of the friends of person X?', which is in fact a breadth-first search with depth=2 and start node X.

The algorithm of FIG. 12 shows the breadth-first algorithm that internally calls the algorithm of FIG. 10. It effectively wraps an iterative matrix-vector multiplication by converting the start vertex set into a vector x and the target vertices vector y back into a result set. Internally, algorithm 1 multiplies the $x_i$ values with the sparse matrix values $(A)_{ij}$, which usually refer to the edge weights. However, the graph must not necessarily have weighted edges. The additional floating point operation is nevertheless rather cheap, so that for unweighted graph edges, the value container Main. Val in line 13, algorithm 1, might just be filled with dummy values. A typical example for an algorithm working on weighted graphs is page rank. A modified version of the algorithm of FIG. 10 is used in the evaluation. The modified version uses sparse vectors for x and y, i.e., a tuple list of <row, val> pairs instead of a dense array. This is in particular a reasonable choice for very sparse matrices, since the number of non-zero entries of the product vector y depends on the matrix population density $\rho=N_{nz}/(n\times n)$ and the number of non-zero elements of x.

Evaluation is achieved by first comparing the static query execution performance of the main-delta architecture against the different various possible matrix representations previously mentioned. Thereafter, the performance on dynamic workloads using the Example 1 is improves against naive approaches.

The system for a prototype implementation contains an Intel Xeon X5650 CPU with 48 GB RAM. As there are currently no standardized benchmarks for large scale linear algebra operations in a database context, it is difficult to provide a comprehensive comparison against other systems. Therefore, the real world example workflows described above were taken and compared against the presented architecture to evaluate performance against alternative variants that could be implemented in a database system. In the context of this evaluation, single-threaded versions of the algorithms were implemented. However, as each of the structures is horizontally partitionable, it is expected that a parallelization does not change the qualitative results for the applied algorithms.

Table 1 lists the matrix data sets used in the evaluation.

| Name | Matrix Type | Dim. | $N_{nz}$ | ρ[%] |
|---|---|---|---|---|
| Mat1 | NCSM | 800 | 309K | 47.2 |
| Mat2 | NCSM | 3440 | 2.930M | 24.7 |
| Mat3 | NCSM | 17040 | 42.962M | 14.8 |
| Gra1 | Slashdot Netw. | 77360 | 905K | 0.01 |
| Gra2 | Roadnet CA | 1,971K | 5.533M | $10^{-6}$ |

In particular, Table 1 shows Sparse matrices and graphs of different dimensions and population densities. The $\rho = N_{nz}/(n \times n)$ value denotes the population density (rounded) of each matrix. All matrices are square (n×n).

The matrix data sets of Table 1 include three Hamiltonian matrices from a nuclear science simulation of different scale (Mat1, Mat2 & Mat3), a social (Gra1) and a street network graph (Gra2). The Hamiltonian matrices stem from a no core shell model (NCSM) simulation and were provided by the theoretical nuclear physics research group of the Technical University of Darmstadt. The graphs are taken from the SNAP graph library (http://snap.stanford.edu/data/index.html).

The static algorithm execution is now described. FIGS. 6A-F show the relative performance comparison of the algorithm of FIG. 10 using a columnar main-delta sparse matrix architecture against the following representations.

For a pure CSR representation, the immutable CSR representation is taken as a baseline for the algorithmic performance for the static experiments. For a triple representation, the pure triple representation serves as naive alternative approach for database-integrated algebra on mutable sparse matrices. For a dense representation, this is included in the following cases only for illustrational purposes only, since it is not scaling and for most sparse matrices its memory consumption is order of magnitudes higher, as for example $10^5 \times$ for Gra2.

In this experiment, values of random matrix elements were subsequently set. The matrix coordinates were chosen randomly in order to get an unbiased perception of the set performance. The varying matrix population density ρ is denoted along the x-axis of the plots, which reaches up to a complete occupation (Mat1) with nonzero elements (ρ=100%). The saw-tooth line belongs to the main-delta representation. Its shape is reasoned by the dynamically growing number of non-zero elements. All elements that are inserted into the main-delta architecture are at first accommodated by the delta triple representation. Thus, the delta size continuously increases until a certain occupation threshold $\Delta_T$ is reached, which was set to 15%. Then, the delta part is merged into the main structure and the delta occupation shifts back to zero. The main-delta execution time is then effectively a superposition of the triple and CSR representation, i.e. $T_{m/d} = T_{CSR}((1-\Delta)\rho) + T_{triple}(\Delta\rho)$. The sort overhead for the pure CSR representation is not included in the static measurement, but it is taken into consideration in the second part of the evaluation.

The plots of FIGS. 6A-D differ in the number of nonzero elements of the vector x that takes part in the multiplication. This variable, which we call $\rho^x = N_{nz}^x/m$, has a significant influence on the performance of the algorithm of FIG. 10 and becomes even more significant for the algorithm of FIG. 12 on the graph Gra1 data set. With increasing $\rho^x$ the runtime performance of the triple representation approaches to that of CSR, which also explains why the slope of saw-tooth decreases with increasing $\rho^x$. If every element $x_i$ is nonzero, the advantage of having the CSR index disappears, since each matrix row has to be visited either way. Hence, the remaining benefit of the CSR representation is solely its row-major ordering, which leads to a better cache locality. It is worthwhile mentioning, that even for completely dense matrices, the dense representation does not result in a better performance than using a CSR representation. This could be explained with the sequential single-pass access pattern of the algorithm of FIG. 10, which allows prefetching of both the column and the value container. Finally, the $O(N_{nz})$ behavior of the algorithm of FIG. 10 results in a 1/ρ-convergence of the dense performance relative to CSR.

A similar measurement was carried out using the inclusive breadth-first search (algorithm of FIG. 12) on both graphs (Gra1 and Gra2). Therefore, the graph matrices were left unmanipulated and solely varied the search depth parameter of the algorithm of FIG. 12, which is denoted along the x-axis of the plots. It is noted that the main-delta architecture is (up to a negligibly deviation) equal to CSR in this measurement, since we consider an isolated query execution on static data under the condition that all data has been merged and is residing in the main structure.

Figure 7A:
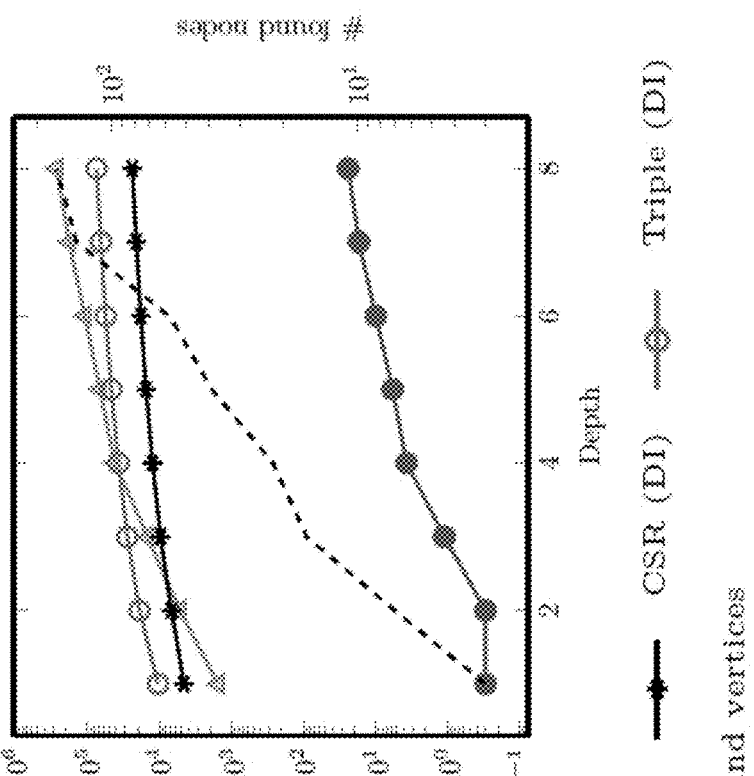
FIGS. 7A-B shows comparison of the execution duration of the algorithm of FIG. 12 on graph Gra1 and Gra2 between a CSR and a triple table with respective sparse (SpI) and dense (DI) intermediate structures. The x-axis denotes the depth parameter of the algorithm of FIG. 12.
Figure 7B:
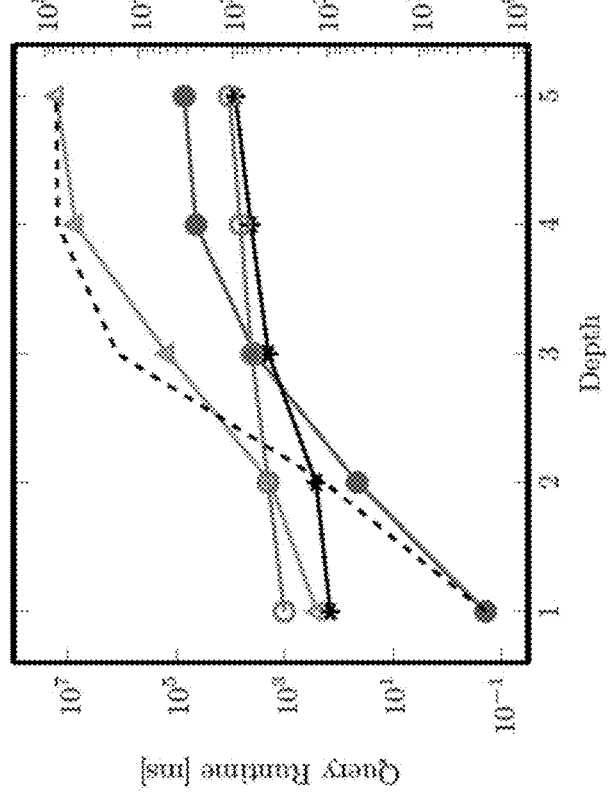

FIGS. 7A-B present the execution runtimes of CSR and triple representation, each with the dense and the sparse version of the intermediate result vectors x, y. The noticeable influence of the x vector population density $\rho^x$, which refers to the number of discovered vertices Q in the algorithm of FIG. 12, on the overall algorithmic performance was already observed in the previous measurements in FIGS. 6A-F. This dependency is even more significant for the inclusive breadth-first search, since the start x vector only contains a single non-zero element. In this case, the dense array-based x implementation (DI) iterates over every zero entry, which is why the of FIG. 12 performs obviously worse for small depths than using the list-based sparse x implementation (SpI). However, there is a turning point, where the vector density x reaches a certain density threshold $\rho^x_T$, the exact value of which depends on the details of the respective implementation. In the experiment, the turning point is reached between depths two and three for the social graph Gra1. In the analogous measurement on Gra2, the turning point depth is at a considerably larger depth, which exceeds the x-range of the plot.

Finding the right spot to internally switch from a sparse to a dense x provides clearly a tweak option that could be part of an optimizer. Nevertheless, it is observed that independent from the intermediate vector representation, the inclusive breadth-first search using the CSR representation outperforms the naive triple approach by up to four orders of magnitude (FIGS. 6A-E, SpI). This can be reasoned with the index character of CSR, which is of particular importance for hypersparse problems, which are regularly found in graph contexts Dynamic workload is now discussed. The throughput of dynamic workloads was measured on large, sparse matrix data and the main-delta architecture was compared against four different alternative approaches. These include the triple, the dense representation, and the following.

A CSRMem approach is taken as a baseline for the following comparisons. A cached CSR version of the sparse matrix is kept in memory and is only rebuilt when an read query is requested, after a manipulation of the matrix has been executed.

A copy-sort CSR approach is compared against a naïve approach, which includes copying and ordering of the data before each algorithm execution request. This is commonly done in science and analytic work flows, in order to transfer the data and bring it in shape for a third party system, where the actual calculations are executed.

EXAMPLE 3

In the first experiment, consecutive single element inserts (write queries) are interleaved with periodic executions of the algorithm of FIG. 10 (read queries). Moreover, the ratio of the number of read queries $N_{read}$ to the number of interleaved writes $N_{write}$ was varied according to following formula: $N_{read}+N_{write}=(1+\alpha)N_{read}$, where α is the insert-to-query ratio $N_{write}/N_{read}$ which takes values from 0.02 to 1.

Figure 8B:
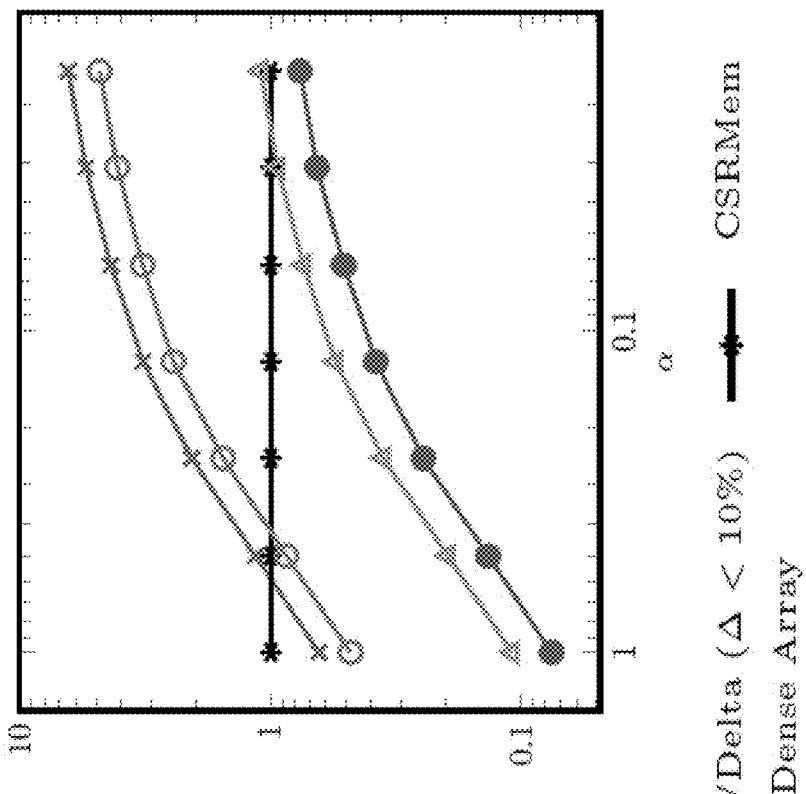
FIGS. 8A-B show comparison of the overall query throughput with $N_{read}$=50 using the different approaches relative to CSRMem on Mat1 and Mat3.
Figure 8A:
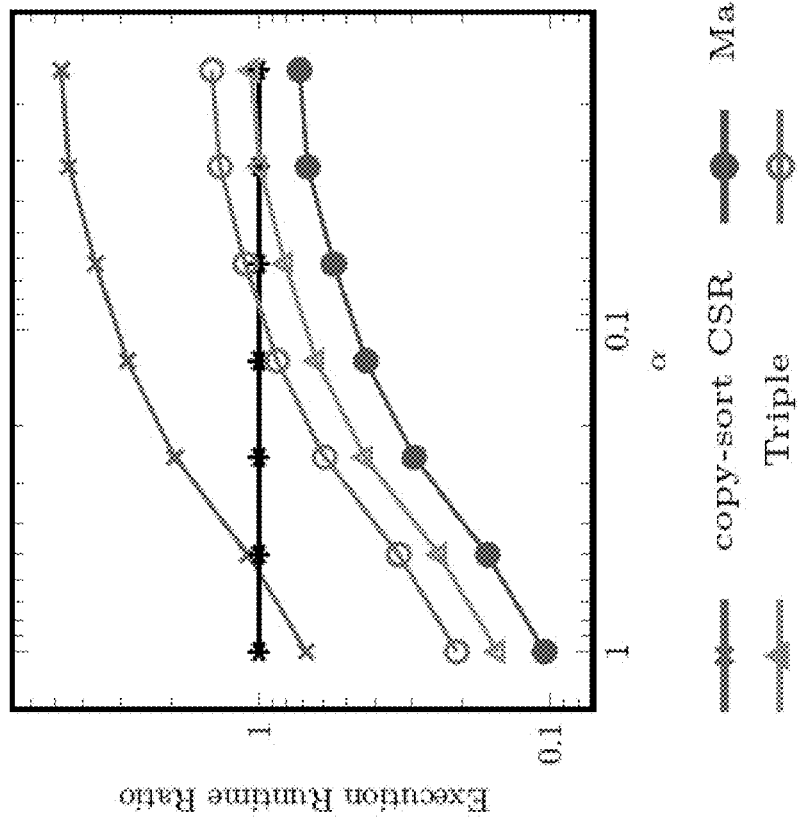
Figure 9B:
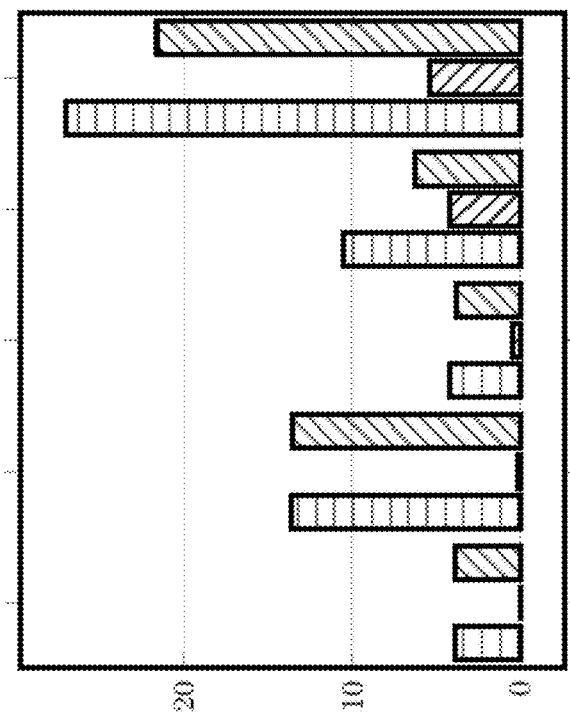
FIGS. 9A-9D show average duration of a matrix k-rows (upper plot) and a k-column (lower plot) delete operation and the following algorithm of FIG. 10 (20 times repeated) execution query. The left bar denotes the total query execution time. The operations were performed on matrix Mat1 and Mat2 with k=0.01m and k=0.01n, respectively.
Figure 9A:
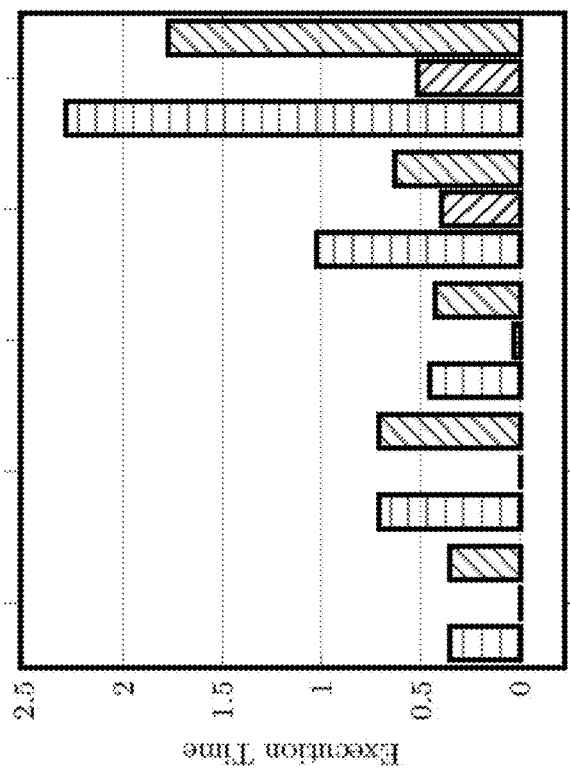
Figure 9D:
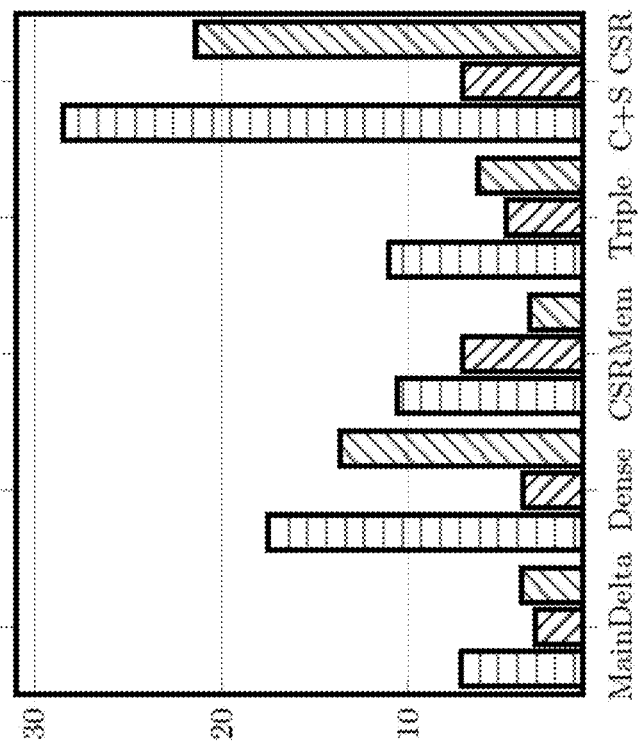
Figure 9C:
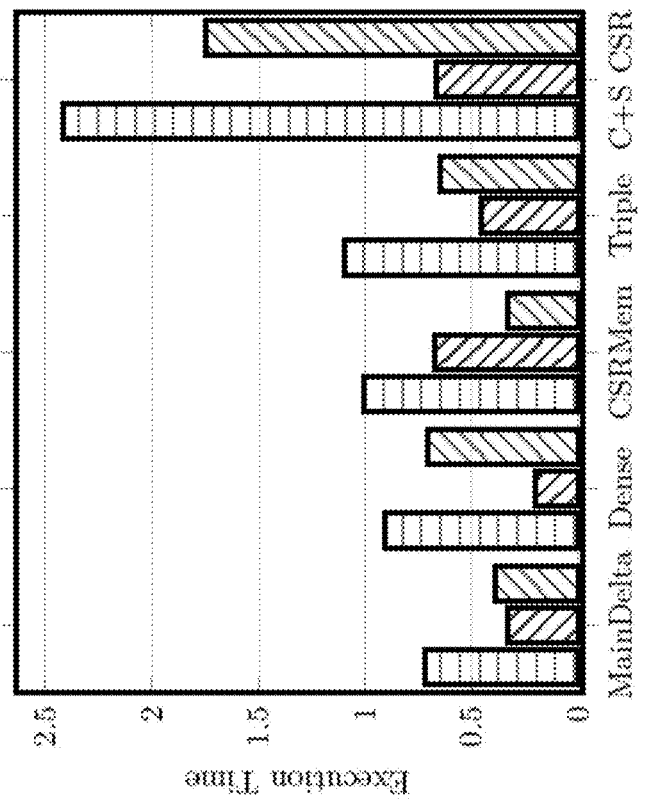

FIGS. 8A-B present the resulting relative query throughput of a mixed query work flow performed on matrices Mat1 and Mat3. To put it in other words, it shows the speedup factor of the overall execution time for $N_{read}+N_{write}=50$ queries using a main-delta architecture and other approaches compared relative to CSRMem. For α→1, the main-delta architecture outperforms the naive CSRMem and copy-sort CSR approaches by orders of magnitude, whereas the difference to the triple and dense array representation is similar as in the static comparison, since these structures are both mutable and not significantly affected by interleaved inserts.

EXAMPLE 4

A second experiment chose a scenario close to the work flow from theoretical nuclear physics that is sketched in the algorithm of FIG. 11. Although the original scenario comprises row and column deletions, it was decided to split the experiment in a row- and an column-exclusive deletion variant, in order to measure the impact of linearization on the respective deletions.

FIGS. 9A-D show the average duration of a k-rows delete operation (k=0.01m), which is followed by a read query. It is observable that the deletion costs of the main-delta architecture are negligible, and the algorithm execution performance is nearly as good as the pure CSR representation. The low costs of the delete row operand on the dense and CSRMem representations can be explained by its efficient implementation, which essentially consists of copying of a contiguous memory section.

The analogous measurements for column delete operations shows that the main-delta approach has the best deletion performance on Mat2. When the matrix is larger, the impact of cache misses by jumping over the row-major ordered dense array increases significantly.

In summary, embodiments present an approach to integrate sparse matrices into a column-oriented in-memory database system with integrated support for updates and deletions of matrix elements. The evaluation has shown that the algorithmic performance of the architecture of a read-optimized main and a write-optimized, mutable delta representation outperforms naive approaches and deviates only negligibly from using immutable structures. Moreover, the integer dictionary encoding of the columnar database architecture allows an easy transition from pure numerical matrices to general structured data, for example graph data.

The architecture according to embodiments is extensible to integrate and take advantage of efficient numerical C++ libraries, since the use of the well-known CSR sparse matrix structures dispenses the need of time- and memory-consuming data conversations. It is shown that introducing mutability of sparse matrices without losing algorithmic performance yields to an overall benefit for users of dynamic sparse matrix workloads. Finally, database technologies are used to improve the overall performance for graph algorithms and science work flows, which bridges the gap between linear algebra and relational DBMS's.

Figure 14:
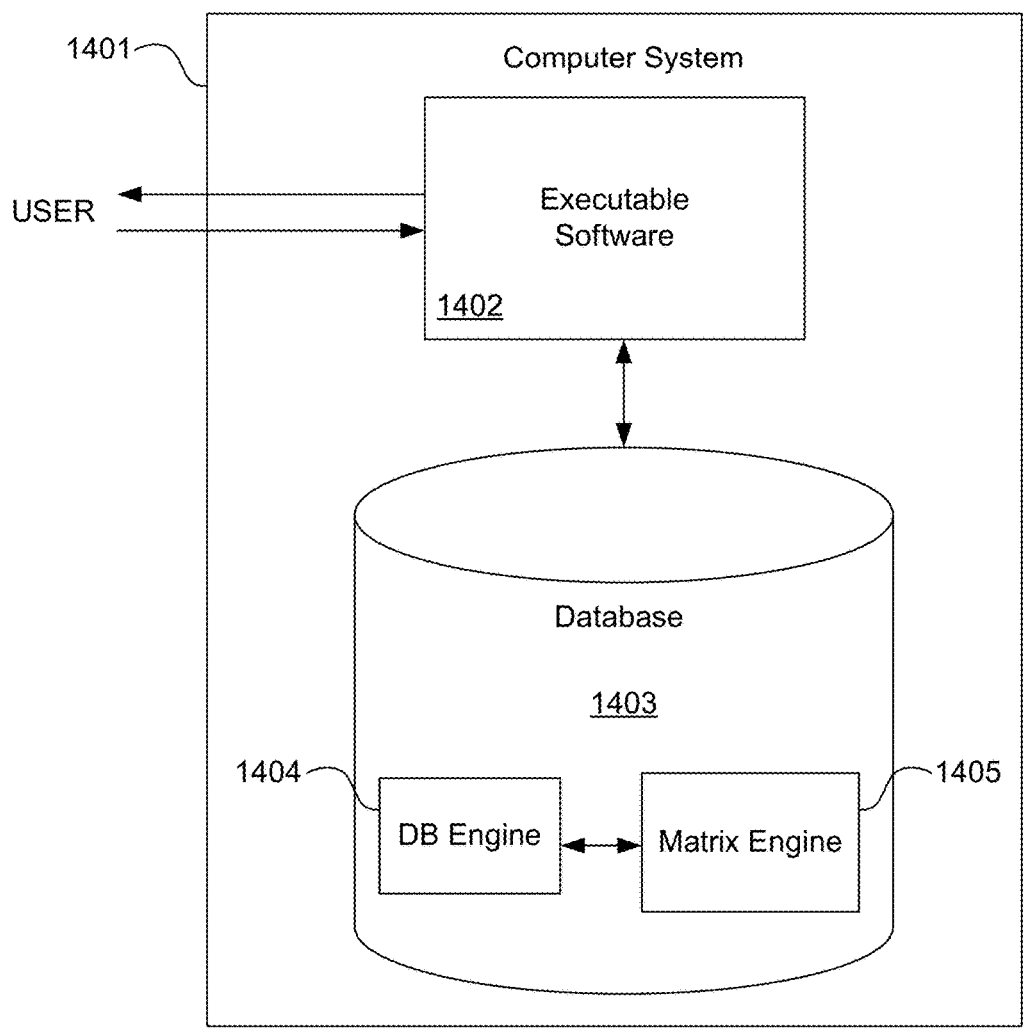
FIG. 14 illustrates hardware of a special purpose computing machine configured to perform linear algebra according to an embodiment.

FIG. 14 illustrates hardware of a special purpose computing machine configured to perform linear algebra according to an embodiment. In particular, computer system 1401 comprises a processor 1402 that is in electronic communication with a non-transitory computer-readable storage medium 1403. This computer-readable storage medium has stored thereon code 1404 corresponding to an in-memory database engine. Code 1405 corresponds to a matrix engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 15:
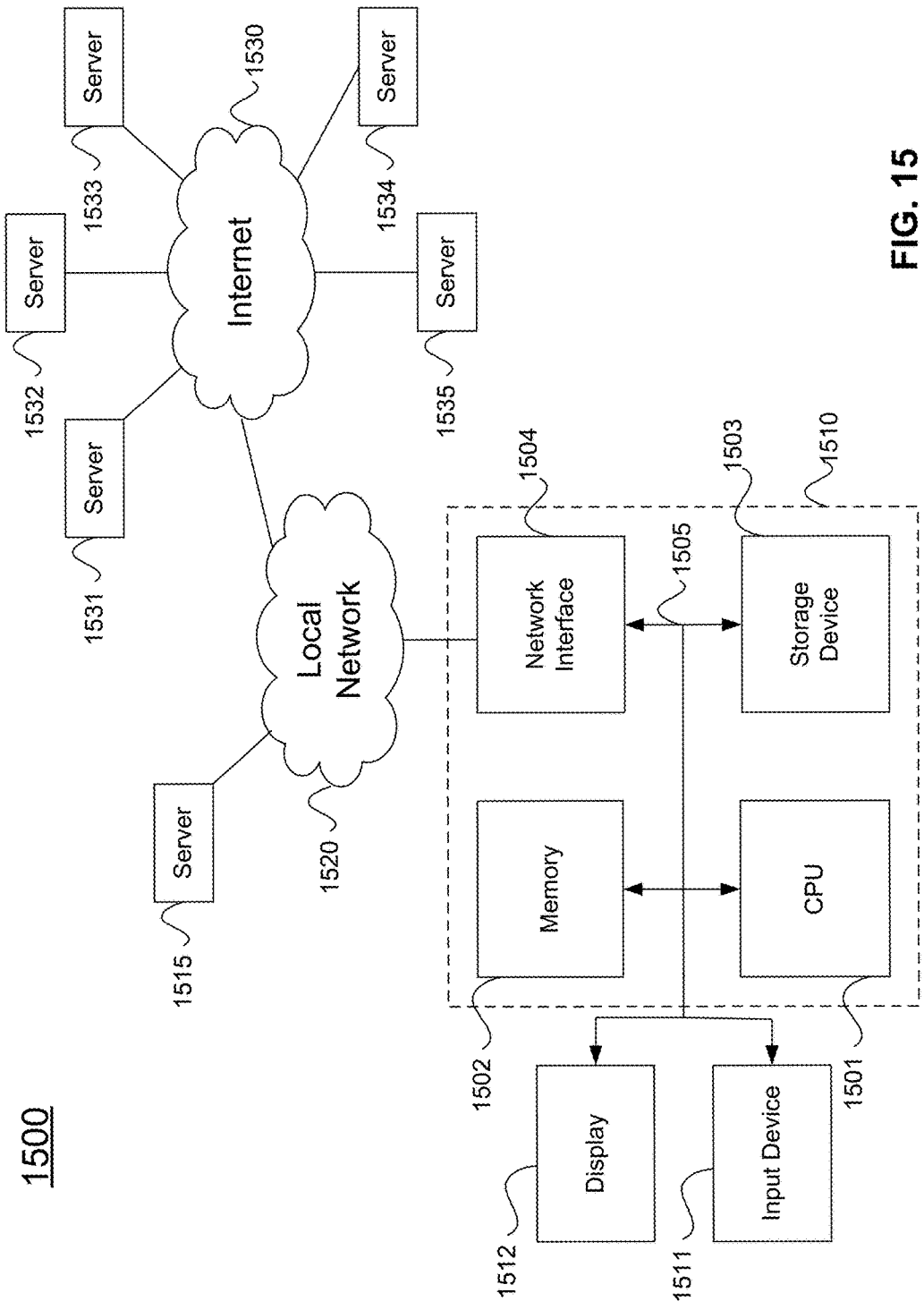
FIG. 15 illustrates an example of a computer system.

An example computer system 1510 is illustrated in FIG. 15. Computer system 1510 includes a bus 1505 or other communication mechanism for communicating information, and a processor 1501 coupled with bus 1505 for processing information. Computer system 1510 also includes a memory 1502 coupled to bus 705 for storing information and instructions to be executed by processor 1501, including information and instructions for performing the techniques described above, for example. This memory may also be used for storing variables or other intermediate information during execution of instructions to be executed by processor 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1503 may include source code, binary code, or software files for performing the techniques above, for example. Storage device and memory are both examples of computer readable mediums.

Computer system 1510 may be coupled via bus 1505 to a display 1512, such as a cathode ray tube (CRT) or liquid crystal display (LCD), for displaying information to a computer user. An input device 1511 such as a keyboard and/or mouse is coupled to bus 1505 for communicating information and command selections from the user to processor 1501. The combination of these components allows the user to communicate with the system. In some systems, bus 1505 may be divided into multiple specialized buses.

Computer system 1510 also includes a network interface 1504 coupled with bus 1505. Network interface 1504 may provide two-way data communication between computer system 1510 and the local network 1520. The network interface 1504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1504 sends and receives electrical, electromagnetic, or optical signals that carry digital data streams representing various types of information.

Computer system 1510 can send and receive information, including messages or other interface actions, through the network interface 1504 across a local network 1520, an Intranet, or the Internet 1530. For a local network, computer system 1510 may communicate with a plurality of other computer machines, such as server 1515. Accordingly, computer system 1510 and server computer systems represented by server 1515 may form a cloud computing network, which may be programmed with processes described herein. In the Internet example, software components or services may reside on multiple different computer systems 1510 or servers 1531-1535 across the network. The processes described above may be implemented on one or more servers, for example. A server 1531 may transmit actions or messages from one component, through Internet 1530, local network 1520, and network interface 1504 to a component on computer system 1510. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
    causing an engine to store an updatable column representation of data including a table in a main structure and in a delta structure of an in-memory database, the data comprising a matrix defined by an extension of structured query language (SQL) by a matrix stack outside of the engine to include a matrix data type storing matrix dimensions as metadata recognized by a data manipulation primitive of the extension, the data manipulation primitive specifying a shrinking of the matrix dimensions;
    causing the engine to merge the delta structure into the main structure when a delta exceeds a threshold comprising a fixed percentage of the main structure;
    causing the engine to perform a reorganization to,
        improve the compression ratio by reordering rows of the table, and
        sort columns of the updatable column representation according to values of the table;
    causing the engine to derive an index according to the sorted columns;
    causing the engine to store the index within the engine;
    causing the matrix stack to reference the index to perform an algebraic operation comprising iterative matrix-vector multiplication in an inclusive breadth-first search;
    causing the engine to store a result of the algebraic operation; and
    causing the engine to update the delta structure by appending a triple utilizing the extension of SQL.

2. A method as in claim 1 wherein the column representation comprises a Compressed Sparse Row (CSR) representation and a value comprises a row pointer.

3. A method as in claim 1 wherein the matrix is fetched using a topological reference according to an access pattern.

4. A method as in claim 1 wherein the column representation utilizes dictionary encoding.

5. A method as in claim 1 further comprising updating the delta structure utilizing a validity control vector.

6. A non-transitory computer readable storage medium embodying a computer program for performing a method, said method comprising:
    causing an engine to store an updatable column representation of data including a table in a main structure and in a delta structure of an in-memory database, the data comprising a matrix defined by an extension of structured query language (SQL) by a matrix stack outside of the engine to include a matrix data type storing matrix dimensions as metadata recognized by a data manipulation primitive of the extension, the data manipulation primitive specifying a shrinking of the matrix dimensions;
    causing the engine to merge the delta structure into the main structure when a delta exceeds a threshold comprising a fixed percentage of the main structure;
    causing the engine to perform a reorganization to,
        improve the compression ratio by reordering rows of the table, and
        sort columns of the updatable column representation according to values of the table;
    causing the engine to derive an index according to the sorted columns;
    causing the engine to store the index within the engine;
    causing the matrix stack to reference the index to perform an algebraic operation comprising iterative matrix-vector multiplication in an inclusive breadth-first search;
    causing the engine to store a result of the algebraic operation; and
    causing the engine to update the delta structure by appending a triple utilizing the extension of SQL.

7. A non-transitory computer readable storage medium as in claim 6 wherein the column representation comprises a Compressed Sparse Row (CSR) representation and a value comprises a row pointer.

8. A non-transitory computer readable storage medium as in claim 6 wherein the matrix is fetched using a topological reference according to an access pattern.

9. A non-transitory computer readable storage medium as in claim 6 wherein the column representation utilizes dictionary encoding.

10. A non-transitory computer readable storage medium as in claim 6 further comprising updating the delta structure utilizing a validity control vector.

11. A computer system comprising:
    one or more processors;
    a software program, executable on said computer system, the software program configured to:
    cause an engine to store an updatable column representation of data including a table in a main structure and in a delta structure of an in-memory database, the data comprising a matrix defined by an extension of structured query language (SQL) by a matrix stack outside of the engine to include a matrix data type storing matrix dimensions as metadata recognized by a data manipulation primitive of the extension, the data manipulation primitive specifying a shrinking of the matrix dimensions;
    cause the engine to merge the delta structure into the main structure when a delta exceeds a threshold comprising a fixed percentage of the main structure;
    cause the engine to perform a reorganization to,
        improve the compression ratio by reordering rows of the table, and sort columns of the updatable column representation according to values of the table;
cause the engine to derive an index according to the sorted columns;
cause the engine to store the index within the engine;
cause the engine to reference the matrix stack to perform an algebraic operation;
cause the engine to store a result of the algebraic operation comprising iterative matrix-vector multiplication in an inclusive breadth-first search; and
cause the engine to update the delta structure by appending a triple utilizing the extension of SQL.

12. A computer system as in claim 11 wherein the column representation comprises a Compressed Sparse Row (CSR) representation and a value comprises a row pointer.

13. A computer system as in claim 11 wherein the matrix is fetched using a topological reference according to an access pattern.

14. A computer system as in claim 11 wherein the column representation utilizes dictionary encoding.

15. A computer system as in claim 11 wherein the engine is further caused to update the delta structure utilizing a validity control vector.

16. A computer system as in claim 11 wherein the engine references a transposed structure of the matrix stack to perform the algebraic operation.

17. A method as in claim 1 wherein the engine references a transposed structure of the matrix stack to perform the algebraic operation.

18. A non-transitory computer readable storage medium as in claim 6 wherein wherein the engine references a transposed structure of the matrix stack to perform the algebraic operation.

* * * * *